(12) United States Patent
Ha et al.

(10) Patent No.: US 11,949,984 B2
(45) Date of Patent: Apr. 2, 2024

(54) ELECTRONIC DEVICE THAT PERFORMS A DRIVING OPERATION OF A SECOND CAMERA BASED ON A DETERMINATION THAT A TRACKED OBJECT IS LEAVING THE FIELD OF VIEW OF A MOVEABLE FIRST CAMERA HAVING A LESSER ANGLE OF VIEW THAN THE SECOND CAMERA, METHOD FOR CONTROLLING THE SAME, AND RECORDING MEDIUM OF RECORDING PROGRAM

(71) Applicant: Samsung Electronics Co., Ltd., Suwon-si (KR)

(72) Inventors: Seungtae Ha, Suwon-si (KR); Wonseok Song, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 17/692,645

(22) Filed: Mar. 11, 2022

(65) Prior Publication Data

US 2022/0294986 A1    Sep. 15, 2022

Related U.S. Application Data

(63) Continuation of application No. PCT/KR2022/003295, filed on Mar. 8, 2022.

(30) Foreign Application Priority Data

Mar. 12, 2021   (KR) .......................... 10-2021-0032918

(51) Int. Cl.
*H04N 5/335*   (2011.01)
*H04N 23/45*   (2023.01)
(Continued)

(52) U.S. Cl.
CPC ........... *H04N 23/667* (2023.01); *H04N 23/45* (2023.01); *H04N 23/57* (2023.01); *H04N 23/69* (2023.01);
(Continued)

(58) Field of Classification Search
None
See application file for complete search history.

(56) References Cited

U.S. PATENT DOCUMENTS 6,809,760 B1   10/2004  Takagi et al.
9,253,397 B2    2/2016  Lee et al.
(Continued)

FOREIGN PATENT DOCUMENTS

CN    107147838 B    9/2018
JP    06325180 A2   11/1994
(Continued)

OTHER PUBLICATIONS

International Search Report dated Jun. 20, 2022, issued in an International Application No. PCT/KR2022/003295.

*Primary Examiner* — Gary C Vieaux
(74) *Attorney, Agent, or Firm* — Jefferson IP Law, LLP

(57) ABSTRACT

An electronic device is provided. The electronic device includes a first camera module, a second camera module with greater angle of view than the first camera module, and a processor configured to generate, in a first mode, an output image from first image data generated by the first camera module, control a direction of the angle of view of the first camera module while tracking a first object to change a field of view (FOV) of the first camera module, perform a driving preparation operation for the second camera module to change a driving operation of the second camera module from the first mode to a second mode, based on a determination that the first object is to leave the FOV of the first
(Continued)

US 11,949,984 B2
Page 2 camera module, and generate, when the driving operation of the second camera module has completely changed to the second mode, the output image from second image data generated by the second camera module.

20 Claims, 15 Drawing Sheets

(51) Int. Cl.
  *H04N 23/57* (2023.01)
  *H04N 23/667* (2023.01)
  *H04N 23/69* (2023.01)
  *H04N 23/695* (2023.01)
  *H04N 23/951* (2023.01)

(52) U.S. Cl.
  CPC ......... *H04N 23/695* (2023.01); *H04N 23/951* (2023.01)

(56) References Cited

U.S. PATENT DOCUMENTS

| | | | |
|---|---|---|---|
| 9,438,792 B2 * | 9/2016 | Nakada | H04N 23/69 |
| 9,854,161 B2 | 12/2017 | Jeong et al. | |
| 9,979,882 B2 | 5/2018 | Edpalm | |
| 10,268,900 B2 * | 4/2019 | Divakaran | G06V 20/52 |
| 10,291,842 B2 | 5/2019 | Kim et al. | |
| 10,447,908 B2 | 10/2019 | Lee et al. | |
| 10,573,011 B2 | 2/2020 | Kim et al. | |
| 11,196,943 B2 | 12/2021 | Gao et al. | |
| 2004/0252194 A1 * | 12/2004 | Lin | H04N 7/181 |
| | | | 348/E7.086 |
| 2022/0063096 A1 | 3/2022 | Ju et al. | |

FOREIGN PATENT DOCUMENTS

| | | |
|---|---|---|
| JP | 2000069346 A2 | 3/2000 |
| JP | 2000-101902 A | 4/2000 |
| JP | 3615868 B2 | 2/2005 |
| JP | 2012-099887 A | 5/2012 |
| JP | 5354255 B2 | 11/2013 |
| JP | 6639151 B2 | 2/2020 |
| KR | 10-2017-0000311 A | 1/2017 |
| KR | 10-2017-0060411 A | 6/2017 |
| KR | 10-2018-0042718 A | 4/2018 |
| KR | 10-2018-0092621 A | 8/2018 |
| KR | 10-1954192 B1 | 3/2019 |
| KR | 10-2020-0087361 A | 7/2020 |
| KR | 10-2020-0138021 A | 12/2020 |
| KR | 10-2022-0099789 A | 7/2022 |
| KR | 10-2022-0102401 A | 7/2022 |

* cited by examiner

ELECTRONIC DEVICE THAT PERFORMS A DRIVING OPERATION OF A SECOND CAMERA BASED ON A DETERMINATION THAT A TRACKED OBJECT IS LEAVING THE FIELD OF VIEW OF A MOVEABLE FIRST CAMERA HAVING A LESSER ANGLE OF VIEW THAN THE SECOND CAMERA, METHOD FOR CONTROLLING THE SAME, AND RECORDING MEDIUM OF RECORDING PROGRAM

CROSS-REFERENCE TO RELATED APPLICATION(S)

This application is a continuation application, claiming priority under § 365(c), of an International application No. PCT/KR2022/003295, filed on Mar. 8, 2022, which is based on and claims the benefit of a Korean patent application number 10-2021-0032918, filed on Mar. 12, 2021, in the Korean Intellectual Property Office, the disclosure of which is incorporated by reference herein in its entirety.

TECHNICAL FIELD

Embodiments of the disclosure relate to an electronic device, a method of controlling the same, and a computer-readable recording medium having recorded thereon a program for executing the method of controlling the electronic device on a computer.

BACKGROUND ART

Lately, as cameras are applied to various kinds of electronic devices, as well as a configuration of using two or more cameras in an electronic device, a configuration of using a single camera in an electronic device is also widely used. When an electronic device uses two or more cameras, output image switching between the cameras is carried out. In existing methods, such output image switching has been performed manually. However, when output switching of cameras is performed manually as in the existing methods, a delay of the output switching of the cameras results in image stuttering. Also, when capturing an image while tracking a moving object, in some cases, the existing methods adopting manual switching miss the moving object.

DESCRIPTION OF EMBODIMENTS

Technical Problem

Aspects of the disclosure are to address at least the above-mentioned problems and/or disadvantages and to provide at least the advantages described below. Embodiments of the disclosure are directed to provide an electronic device using two cameras and configured to perform quick and smooth switching between the cameras by automatically performing switching of the cameras based on an object's movement, a method of controlling the electronic device, and a recording medium having recorded thereon a program.

Technical Solution to Problem

In accordance with an aspect of the disclosure, an electronic device is provided. The electronic device includes a first camera module of which an angle of view is movable, a second camera module of which an angle of view is greater than the angle of view of the first camera module, and at least one processor configured to generate, in a first mode, an output image from first image data generated by the first camera module, control a direction of the angle of view of the first camera module while tracking a first object to change a field of view (FOV), perform a driving preparation operation for the second camera module to change a driving operation of the second camera module from the first mode to a second mode, based on a determination that the first object departs from the FOV of the first camera module, and generate, when the driving operation of the second camera module has completely changed to the second mode, the output image from second image data generated by the second camera module.

Also, according to an embodiment of the disclosure, the at least one processor may be further configured to generate the output image by cropping an area corresponding to the FOV of the first camera module from the second image data of the second camera module when an initial output image generated after the first mode changes to the second mode is processed.

Also, according to an embodiment of the disclosure, the at least one processor may be further configured to calculate a velocity of the first object, and determine whether the first object departs from the FOV of the first camera module, based on the velocity of the first object.

Also, according to an embodiment of the disclosure, the at least one processor may be further configured to determine, when a moving velocity of the first object is higher than a moving velocity of the FOV of the first camera module, that the first object departs from the FOV of the first camera module.

Also, according to an embodiment of the disclosure, the at least one processor may be further configured to determine that the first object departs from the FOV of the first camera module, in at least one case of when a moving path of the first object is expected to leave a FOV movable range of the first camera module, when a moving velocity of the first object is higher than a moving velocity of the FOV of the first camera module, or when a size of the first object in the first image data is expected to become larger than the FOV of the first camera module.

Also, according to an embodiment of the disclosure, the at least one processor may be further configured to determine that the first object departs from the FOV of the first camera module when a size of the first object is larger than the FOV of the first camera module.

Also, according to an embodiment of the disclosure, the at least one processor may be further configured to perform a driving preparation operation for the first camera module to change a driving operation of the first camera module from the second mode to the first mode, based on a determination that the first camera module is capable of tracking the first object, while operating in the second mode, and generate the output image from the first image data of the first camera module when the driving operation of the first camera module has completely changed to the first mode.

Also, according to an embodiment of the disclosure, the first camera module may include a prism, and the at least one processor may be further configured to move the angle of view of the first camera module by moving the prism.

Also, according to an embodiment of the disclosure, the at least one processor may be further configured to move the angle of view of the first camera module by moving at least one of at least one lens, a mirror, or an image sensor of the first camera module.

Also, according to an embodiment of the disclosure, a movable range of the angle of view of the first camera module may be included in a range of an angle of view of the second camera module.

Also, according to an embodiment of the disclosure, the driving preparation operation for the second camera module may include an operation of changing image quality and brightness of the second camera module to image quality and brightness of the first camera module.

Also, according to an embodiment of the disclosure, the driving preparation operation for the second camera module may include an operation of changing a frame rate of the second camera module to a frame rate of the first camera module.

Also, according to an embodiment of the disclosure, the driving preparation operation for the second camera module may include interpolation processing between the second image data of the second camera module and the first image data of the first camera module.

Also, according to an embodiment of the disclosure, the driving preparation operation for the second camera module may include an operation of applying power to the second camera module being in a power-off state and setting a parameter value.

Also, according to an embodiment of the disclosure, the at least one processor may be further configured to obtain a 3-dimensional depth of the first object, calculate an angular velocity of the first object, and determine whether the first object departs from the FOV of the first camera module based on the angular velocity of the first object.

In accordance with another aspect of the disclosure, a method of controlling an electronic device is provided. The method includes generating, in a first mode, an output image from first image data generated by a first camera module of which an angle of view is movable, controlling a direction of the angle of view of the first camera module while tracking a first object to change a field of view (FOV), performing a driving preparation operation for the second camera module of which an angle of view is greater than the angle of view of the first camera module to change a driving operation of the second camera module from the first mode to a second mode, based on a determination that the first object departs from the FOV of the first camera module, and generating, when the driving operation of the second camera module has completely changed to the second mode, the output image from second image data generated by the second camera module.

In accordance with another aspect of the disclosure, a computer-readable recording medium having recorded thereon a program for executing the method of controlling the electronic device, on a computer, is provided.

Advantageous Effects of Disclosure

Embodiments of the disclosure are directed to provide an electronic device using two cameras and configured to perform quick and smooth switching between the cameras by automatically performing switching of the cameras based on an object's movement, a method of controlling the electronic device, and a recording medium having recorded thereon a program.

MODE OF DISCLOSURE

Figure 1:
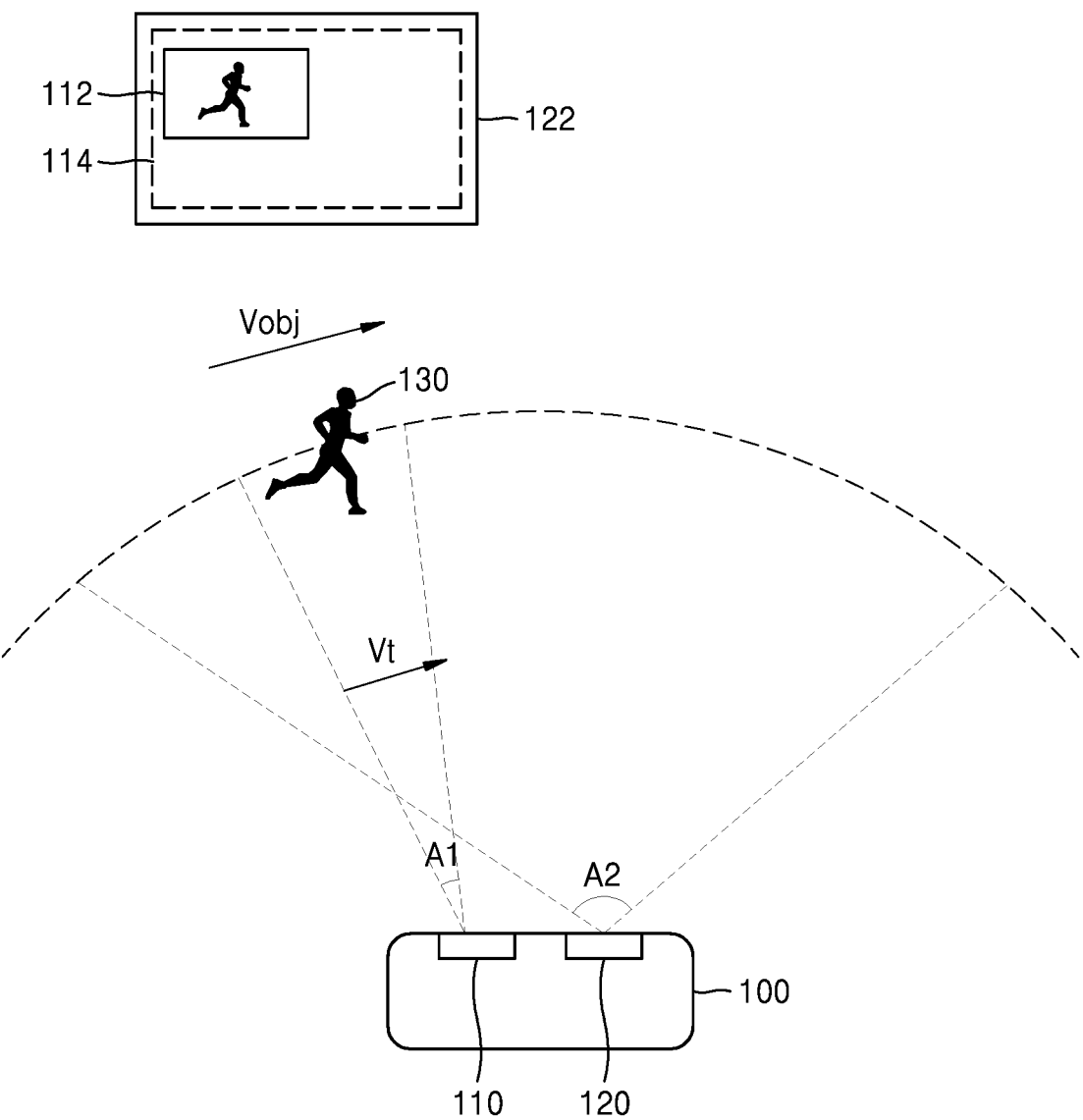
FIG. 1 illustrates an operation of an electronic device according to an embodiment of the disclosure.

The present specification describes and discloses the principle of embodiments to clarify the scope of rights of claims and for one of ordinary skill in the art to which the embodiments of the disclosure belong to execute the embodiments described in the claims. The disclosed embodiments may be implemented in various forms.

Throughout the specification, like reference numerals indicate like components. The disclosure does not describe all components in the embodiments, and common knowledge in the art to which the embodiments of the disclosure belong or the same descriptions of the embodiments will be omitted below. The term "module" or "unit" used in the specification may be implemented as one or more combinations of software, hardware, or firmware, and according to embodiments, a plurality of "modules" or "units" may be implemented as a single element or a single "module" or "unit" may include a plurality of elements.

In the description of embodiments, certain detailed explanations of related art are omitted when it is deemed that they may unnecessarily obscure the gist of the disclosure. Also, numbers (for example, a first, a second, and the like) used in the description of the specification are merely identifier codes for distinguishing one component from another.

Also, in the disclosure, it will be understood that when components are "connected" or "coupled" to each other, the components may be directly connected or coupled to each other, but may alternatively be connected or coupled to each other with an intervening component therebetween, unless specified otherwise.

Hereinafter, the operation principle of various embodiments of the disclosure and the various embodiments will be described with reference to the accompanying drawings.

FIG. 1 illustrates an operation of an electronic device 100 according to an embodiment of the disclosure.

Embodiments of the disclosure disclose the electronic device 100 including two camera modules. The electronic device 100 may include a first camera module 110 and a second camera module 120. The first camera module 110 may have a first angle A1 of view, and the second camera module 120 may have a second angle A2 of view. The first angle A1 of view may be smaller than the second angle A2 of view. According to an embodiment of the disclosure, the first camera module 110 may correspond to a telescope camera module for long-distance photographing, and the second camera module 120 may correspond to a wide angle camera module for short-distance photographing. The first camera module 110 may move an angle of view.

The first camera module 110 may have a smaller angle of view and a narrower field of view (FOV) than the second camera module 120. The first camera module 110 may have a first FOV 112, and the second camera module 120 may have a second FOV 122. The first FOV 112 may have a smaller size than the second FOV 122. When the first angle A1 of view of the first camera module 110 moves, the first FOV 112 may move accordingly. The first FOV 112 may move within an angle-of-view movable range 114. According to an embodiment of the disclosure, the angle-of-view movable range 114 may be included in the second FOV 122.

The electronic device 100 may generate an output image from first image data generated by the first camera module 110 or second image data generated by the second camera module 120. A processor of the electronic device 100 may receive image data from one of the first camera module 110 or the second camera module 120 and generate an output image. The processor of the electronic device 100 may switch an input to the first camera module 110 or the second camera module 120 to receive image data, based on a preset condition.

When the electronic device 100 photographs a moving first object 130, the electronic device 100 may photograph the first object 130 while tracking the first object 130. The electronic device 100 may define an object area while tracking the first object 130, by image processing, and adjust a FOV and a capture area of the first camera module 110 or the second camera module 120 to include the object area. According to an embodiment of the disclosure, the electronic device 100 may photograph the first object 130 while tracking the first object 130 by using the first camera module 110. The electronic device 100 may photograph the first object 130 while tracking the first object 130, by moving the first angle A1 of view of the first camera module 110 to move the first FOV 112.

According to an embodiment of the disclosure, when the first object 130 is expected to leave the first FOV 112 because the first camera module 110 has failed to follow a movement of the first object 130, the electronic device 100 may perform driving preparation for switching an image input from the first camera module 110 to the second camera module 120, and, when the driving preparation of the second camera module 120 is completed, the electronic device 100 may switch an input to the second camera module 120. For example, when a moving velocity Vobj of the first object 130 is higher than a moving velocity Vt of the first angle A1 of view of the first camera module 110, the electronic device 100 may determine that the first object 130 will leave the first FOV 112 of the first camera module 110.

When an input is switched to the second camera module 120 while the electronic device 100 generates an output image from first image data corresponding to the first FOV 112 of the first camera module 110, the electronic device 100 may generate an output image by cropping a preset area including the first object 130 from the second FOV 122 of the second camera module 120. When the electronic device 100 determines that tracking the first object 130 by the first camera module 110 is possible while the electronic device 100 generates an output image from second image data of the second camera module 120, the electronic device 100 may perform a driving preparation operation for the first camera module 110, and switch an input from the second camera module 120 to the first camera module 110.

In the disclosure, a mode of generating an output image from first image data of the first camera module 110 is referred to as a first mode, and a mode of generating an output image from second image data of the second camera module 120 is referred to as a second mode.

Embodiments of the disclosure may give an effect of performing seamless photographing when photographing a moving object while tracking the moving object, by performing, in the case in which the first object 130 is expected to leave the first FOV 112 of the first camera module 110 when the first object 130 moving is photographed by using two camera modules, a driving preparation operation for the second camera module 120 and then, when the driving preparation operation for the second camera module 120 is completed, switching an input to the second camera module 120.

Figure 2:
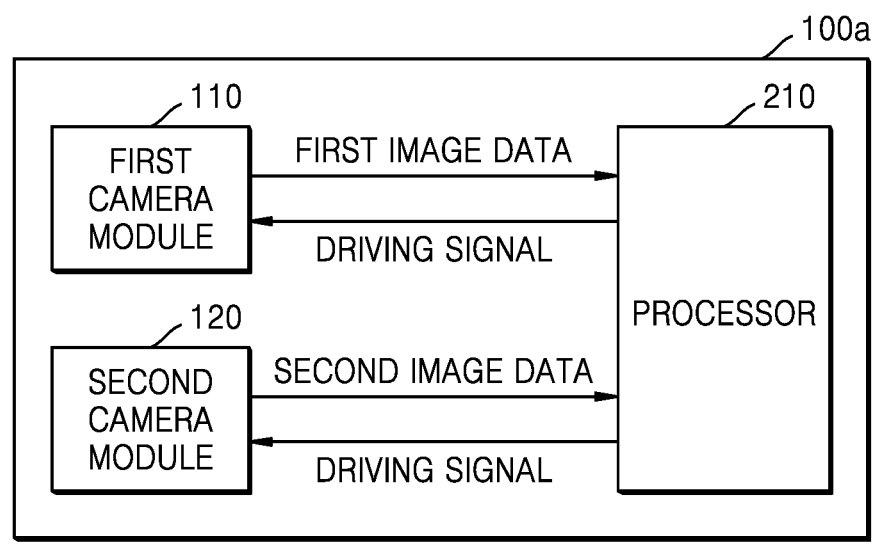
FIG. 2 illustrates a structure of an electronic device according to an embodiment of the disclosure.

FIG. 2 illustrates a structure of an electronic device according to an embodiment of the disclosure.

An electronic device 100a according to an embodiment of the disclosure may include the first camera module 110, the second camera module 120, and a processor 210.

The electronic device 100a according to embodiments of the disclosure may be implemented as various types of devices each including two camera modules and a processor. The electronic device 100a may include at least one of, for example, a smartphone, a tablet personal computer (PC), a mobile phone, a video phone, an e-book reader, a desktop personal computer (PC), a laptop personal computer (PC), a netbook computer, a workstation, a server, a personal digital assistant (PDA), a portable multimedia player (PMP), a MP3 player, mobile medical equipment, a camera, a wearable device, or a flexible device. According to various embodiments of the disclosure, the wearable device may include at least one of an accessory type (e.g., a watch, a ring, a bracelet, an ankle bracelet, a necklace, glasses, contact lenses, or a head-mounted-device (HMD)), a type combined with fabric or clothes (e.g., electronic clothes), a body attaching type (e.g., a skin pad or tattoo), or a body implantable type (e.g., an implantable circuit).

Also, according to another embodiment of the disclosure, the electronic device 100a may be a home appliance. The home appliance may include at least one of, for example, a television, a digital video disk (DVD) player, an audio, a refrigerator, an air conditioner, a cleaner, an oven, a microwave oven, a washing machine, an air cleaner, a set-top box, a home automation control panel, a security control panel, a TV box, a game console, an electronic dictionary, an electronic key, a camcorder, or a digital photo frame.

Also, according to another embodiment of the disclosure, the electronic device 100a may include at least one of various kinds of medical equipment (e.g., various kinds of portable medical measuring instruments (a glucose meter, a heart rate measuring device, a blood pressure monitor, a thermometer, etc.), magnetic resonance angiography (MRA), magnetic resonance imaging (MRI), computed tomography (CT), a photographing device, ultrasonic machinery, etc.), a navigation system, a global navigation satellite system (GNSS), an event data recorder (EDR), a flight data recorder (FDR), a vehicle infotainment device, electronic equipment for ship (e.g., a navigation system for ship, a gyrocompass, etc.), avionics, a security system, a vehicle head unit, an industrial or household robot, an automatic teller's machine (ATM) for financial institutions, a point of sales (POS) for stores, or internet of things (e.g., a bulb, various kinds of sensors, an electric meter, a gas meter, a sprinkler, a fire alarm, a thermostat, a streetlight, a toaster, sporting equipment, a hot water tank, a heater, a boiler, etc.).

Also, according to another embodiment of the disclosure, the electronic device 100a may include at least one of a part of furniture or a building/structure, an electronic board, an electronic signature receiving device, a projector, or various kinds of metering instruments (e.g., a water meter, an electric watt meter, a gas meter, a radio wave meter, etc.). In an embodiment of the disclosure, the electronic device 100a may be one or more combinations of the above-mentioned various devices. Also, the electronic device 100a according to an embodiment of the disclosure is not limited to the above-described devices, and may include a new type of electronic device according to a technological development.

The first camera module 110 may perform photoelectric conversion on incident light to generate an electrical image signal. The first camera module 110 may be integrated into the electronic device 100a or detachably attached to the electronic device 100a. The first camera module 110 according to an embodiment of the disclosure may include at least one lens, a lens driver, an image sensor, and a driving circuit. According to an embodiment of the disclosure, the first camera module 110 may further include an aperture, or an optical device, such as a shutter, etc. The image sensor may be implemented by using, for example, a charged coupled device (CCD) sensor or a complementary metal oxide semiconductor (CMOS) sensor. The image sensor of the first camera module 110 may perform photoelectric conversion on incident light to generate an electrical image signal, and output first image data corresponding to the electrical image signal to the processor 210.

The first camera module 110 may move an angle of view. The first camera module 110 may drive a lens or an image sensor based on a driving signal received from the processor 210, thereby moving the angle of view. According to an embodiment of the disclosure, the first camera module 110 may include at least one optical image stabilization (OIS) lens for OIS driving, and move the angle of view by moving OIS. According to another embodiment of the disclosure, the first camera module 110 may move the angle of view by moving the image sensor. According to another embodiment of the disclosure, the first camera module 110 may include a mirror or a prism lens, and move the angle of view by moving the mirror or the prism lens.

The first camera module 110 may perform a zoom-in operation and a zoom-out operation by adjusting a focal distance by zoom control by the processor 210. The first camera module 110 may correspond to a telescope camera that photographs an object at a long distance.

The second camera module 120 may generate an electrical image signal by performing photoelectric conversion on incident light. The second camera module 120 may be integrated into the electronic device 100a or detachably attached to the electronic device 100a. The second camera module 120 according to an embodiment of the disclosure may include at least one lens, a lens driver, an image sensor, and a driving circuit. According to an embodiment of the disclosure, the second camera module 120 may further include an aperture, or an optical device, such as a shutter, etc. The image sensor may be implemented by using, for example, a CCD sensor or a CMOS sensor. The image sensor of the second camera module 120 may generate an electrical image signal by performing photoelectric conversion on incident light of the second camera module 120, and output second image data corresponding to the electrical image signal to the processor 210.

The second camera module 120 may photograph an object by adjusting a focal distance based on control by the processor 210. The second camera module 120 may correspond to a wide angle camera module that photographs an object at a short distance. A second angle of view of the second camera module 120 may be greater than a first angle of view of the first camera module 110. A FOV of the second camera module 120 may be larger than a FOV of the first camera module 110. A FOV movable range of the first camera module 110 may be included in the FOV of the second camera module 120.

According to an embodiment of the disclosure, the second camera module 120 may perform a zoom-in operation and a zoom-out operation by adjusting a focal distance by zoom control by the processor 210. The second camera module 120 may perform zoom control and adjust a focal distance by adjusting a location of a focal lens based on a driving signal received from the processor 210.

According to another embodiment of the disclosure, the electronic device 100a may use a digital zoom method in a second mode. In the second mode, the second camera module 120 may photograph an object at a preset angle of view, and the processor 210 may generate an output image having a preset zoom level by cropping an image signal received from the second camera module 120. The second camera module 120 may photograph an object at a greatest angle of view or at an angle of view that is close to the greatest angle of view. According to an embodiment of the disclosure, the processor 210 may generate an output image by performing additional processing, such as scale-up processing, image quality processing, etc., on a cropped image.

The processor 210 may control overall operations of the electronic device 100a. The processor 210 may be implemented as one or more processors. For example, the processor 210 may perform a preset operation by executing an instruction or command stored in a memory. According to an embodiment of the disclosure, the processor 210 may correspond to a mobile application processor AP.

The processor 210 may generate an output image by receiving image data from the first camera module 110 or the second camera module 120. The processor 210 may generate an output image corresponding to a still image or a moving image by performing various image processing and compression processing on first image data or second image data. The processor 210 may generate a preview image, a screenshot image, a capture image, a moving image, etc. from the first image data or the second image data.

The processor 210 may generate an output image from at least one of the first image data or the second image data or a combination of the first image data and the second image data, based on various criteria and conditions. For example, the processor 210 may select one of the first camera module 110 or the second camera module 120, based on zoom-in control or zoom-out control, and generate an output image from image data generated by the selected camera module. As another example, the processor 210 may select the first camera module 110 or the second camera module 120 based on a photographing mode. For example, the processor 210 may select the second camera module 120 in a close-up photographing mode for photographing an object at a short distance.

According to an embodiment of the disclosure, the processor 210 may generate an output image by using image data of both the first camera module 110 and the second camera module 120. For example, the processor 210 may perform shake correction processing by using the first image data and the second image data. In this case, the processor 210 may use image data of one camera module of the first camera module 110 and the second camera module 120 as a main input, and use image data of the other camera module as a sub input. A camera module used for a sub input may have a parameter value such as a frame rate set to a lower specification, compared with a camera module used for a main input. For example, when the processor 210 uses first image data of the first camera module 110 as a main input and second image data of the second camera module 120 as a sub input, the processor 210 may set a parameter value such as a frame rate of the second camera module 120 to a lower value than a frame rate of the first camera module 110. Also, the processor 210 may set a frame rate value of the second camera module 120 to a greater value in the second mode using the second camera module 120 for a main input, and set a frame rate value of the second camera module 120 to a lower value in the first mode using the second camera module 120 for a sub input than in the second mode.

According to another embodiment of the disclosure, the processor 210 may use image data of one camera module of the first camera module 110 and the second camera module 120. When the processor 210 uses image data of one camera module of the first camera module 110 and the second camera module 120, the processor 210 may switch an input of image data to the selected camera module and receive image data from the selected camera module. At this time, the other camera module not selected may be powered off, or may operate in a sleep mode for driving with lowest power.

The processor 210 may generate a driving signal for driving the first camera module 110, and output the driving signal to the first camera module 110. Also, the processor 210 may generate a driving signal for driving the second camera module 120, and output the driving signal to the second camera module 120. The first camera module 110 and the second camera module 120 may be driven based on a driving signal generated by and output from the processor 210. The driving signal may include an auto focusing (AF) signal, a manual focal driving signal, an image sensor driving signal, a shutter release signal, a flash driving signal, a parameter setting signal, a camera module activation signal, etc.

The processor 210 may detect a moving first object from the first image data or the second image data, and photograph an output image including the first object while tracking the first object. According to an embodiment of the disclosure, the processor 210 may operate to photograph the first object while tracking the first object in a preset tracking mode. The tracking mode may be selected and set by a user input. According to an embodiment of the disclosure, the processor 210 may detect the first object from first image data or second image data used to generate an output image, and track the first object. The processor 210 may track the first object by using a preset object tracking algorithm. The processor 210 may detect the first object from the first image data or the second image data, and move the angle of view of the first camera module 110 to move a first FOV such that the first FOV includes an area corresponding to the first object.

When the processor 210 photographs the first object while tracking the first object, the processor 210 may preferentially select the first camera module 110, and, when the processor 210 predicts that tracking the first object by the first camera module 110 is impossible, the processor 210 may secondarily select the second camera module 120. Accordingly, when the processor 210 predicts that the first object will leave the first FOV of the first camera module 110 while the processor 210 tracks and photographs the first object by the first camera module 110, the processor 210 may switch an input of image data from the first camera module 110 to the second camera module 120. Also, when the processor 210 predicts that the first object will again enter the first FOV of the first camera module 110 while tracking and photographing the first object by the second camera module 120, the processor 210 may switch an input of image data from the second camera module 120 to the first camera module 110. The first camera module 110 may perform high-resolution photographing centered on the first object due to its high zoom level, whereas the second camera module 120 may photograph a wide area around the first object due to its great angle of view to have high probability of generating an output image with lower resolution than an output image generated from first image data of the first camera module 110 upon cropping of an image centered on the first object. Accordingly, the electronic device 100a may preferentially select the first camera module 110 and generate an output image obtained by tracking the first object.

The processor 210 may predict that the first object will leave the first FOV of the first camera module 110, in various cases. According to an embodiment of the disclosure, when a moving velocity of the first object is higher than that of the angle of view of the first camera module 110, the processor 210 may determine that the first object will leave the first FOV of the first camera module 110. According to an embodiment of the disclosure, the moving velocity of the first object may be measured as an angular velocity. According to another embodiment of the disclosure, the moving velocity of the first object may be measured as a moving velocity on first image data.

According to another embodiment of the disclosure, when the processor 210 predicts that a moving path of the first object will leave a FOV movable range of the first camera module 110, the processor 210 may determine that the first object will leave the first FOV of the first camera module 110.

According to another embodiment of the disclosure, when the processor 210 predicts that a size of the first object in the first image data increases to be larger than the first FOV of the first camera module 110, the processor 210 may determine that the first object will leave the first FOV of the first camera module 110. When a distance between the first object and the electronic device 100 is shortened, a size of the first object in the first image data may increase. In this case, a size of the first object in the first image data may become larger than that of the first FOV. When the first object approaches the electronic device 100 and accordingly the processor 210 predicts that a size of the first object in first image data will become larger than that of the first FOV, the processor 210 may determine that the first object will leave the first FOV of the first camera module 110.

Conditions based on which the first object is determined to leave the first FOV of the first camera module 110 may be applied with various combinations. According to an embodiment of the disclosure, when a moving velocity of the first object is higher than that of the angle of view of the first camera module 110, or when a moving path of the first object is expected to leave the FOV movable range of the first camera module 110, the processor 210 may determine that the first object will leave the first FOV of the first camera module 110. According to another embodiment of the disclosure, the processor 210 may determine that the first object will leave the first FOV of the first camera module 110 by using at least one or combination of when a moving velocity of the first object is higher than that of the angle of view of the first camera module 110, when a moving path of the first object is expected to leave the FOV movable range of the first camera module 110, or when a size of the first object increases to be expected to be larger than the first FOV of the first camera module 110.

When the first object is expected to leave the first FOV of the first camera module 110, the processor 210 may perform a driving preparation operation for the second camera module 120. In the first mode of generating an output image from first image data of the first camera module 110, the second camera module 120 may be deactivated. According to an embodiment of the disclosure, in the first mode, the second camera module 120 may be in a turned-off state in which power is off According to another embodiment of the disclosure, in the first mode, the second camera module 120 may have a low frame rate. According to another embodiment of the disclosure, in the first mode, the second camera module 120 may be in a brighter or darker state than brightness of appropriate exposure. As such, the second camera module 120 may be deactivated in the first mode, and when the first object is expected to leave the first FOV of the first camera module 110, the processor 210 may perform a driving preparation operation for the deactivated second camera module 120.

The processor 210 may perform a driving preparation operation for the second camera module 120 to change a driving operation of the second camera module 120 from the first mode to the second mode. According to an embodiment of the disclosure, the processor 210 may perform a driving preparation operation of switching the second camera module 120 to the second mode, by supplying power and an enable signal to the second camera module 120 of the first mode, which is in a turned-off state. According to another embodiment of the disclosure, the processor 210 may perform a driving preparation operation of switching the second camera module 120 to the second mode, by increasing a low frame rate of the second camera module 120 of the first mode. According to another embodiment of the disclosure, the processor 210 may perform a driving preparation operation of switching the second camera module 120 to the second mode, by adjusting the second camera module 120 which is in a brighter or darker state than brightness of appropriate exposure to the appropriate exposure.

When the driving preparation operation for the second camera module 120 is completed and accordingly, the second camera module 120 operates in the second mode, the processor 210 may generate an output image from second image data of the second camera module 120. When an input of image data is switched from the first camera module 110 to the second camera module 120, the processor 210 may determine a first area corresponding to the first FOV of the first camera module 110 from the second image data of the second camera module 120, and crop the first area from the second image data, thereby generating an output image. The processor 210 may determine the first area from the second image data based on calibration data representing a relationship between the first camera module 110 and the second camera module 120. The calibration data may be data stored in advance in a memory (not shown) of the electronic device 100*a*. The processor 210 may determine an area corresponding to the first image data from the second image data, based on the relationship between the first image data of the first camera module 110 and the second image data of the second camera module 120, the relationship included in the calibration data. The processor 210 may determine and crop a first area in at least one initial frame obtained after switching to the second camera module 120, based on the calibration data, and track the first object from the second image data in the following frames to determine a first area including the first object. The processor 210 may calculate a location of the angle of view of the second camera module 120, corresponding to a moved location of the angle of view of the first camera module 110. At this time, the processor 210 may calculate the location of the angle of view of the second camera module 120, corresponding to the moved location of the angle of view of the first camera module 110, based on the moved location of the angle of view of the first camera module 110 and the calibration data. The processor 210 may generate an output image by cropping the first area from the second image data.

When the first object is expected to enter the FOV of the first camera module 110 while the processor 210 operates in the second mode, the processor 210 may perform a driving preparation operation for the first camera module 110. In the second mode of generating an output image from second image data of the second camera module 120, the first camera module 110 may be deactivated. According to an embodiment of the disclosure, in the second mode, the first camera module 110 may be in a turned-off state in which power is off According to another embodiment of the disclosure, in the second mode, the first camera module 110 may have a low frame rate. According to another embodiment of the disclosure, in the second mode, the first camera module 110 may have a brighter or darker brightness setting or a brighter or darker exposure setting than that of appropriate exposure. As such, the first camera module 110 may be deactivated in the second mode, and when the processor 210 predicts that the first object will enter the FOV of the first camera module 110, the processor 210 may perform a driving preparation operation for the deactivated first camera module 110.

The processor 210 may perform a driving preparation operation for the first camera module 110 to switch a driving operation of the first camera module 110 from the second mode to the first mode. According to an embodiment of the disclosure, the processor 210 may perform a driving preparation operation of switching the first camera module 110 to the first mode, by supplying power and an enable signal to the first camera module 110 of the second mode, which is in a turned-off state. According to another embodiment of the disclosure, the processor 210 may perform a driving preparation operation of switching the first camera module 110 to the first mode, by increasing a frame rate of the first camera module 110 being in the second mode and having a low frame rate. According to another embodiment of the disclosure, the processor 210 may perform a driving preparation operation of switching the first camera module 110 to the first mode, by adjusting the first camera module 110 which is in a brighter or darker state than brightness of appropriate exposure to the appropriate exposure.

When the driving preparation operation for the first camera module 110 is completed and accordingly the first camera module 110 operates in the first mode, the processor 210 may generate an output image from first image data of the first camera module 110. In the second mode, the processor 210 may generate an output image by cropping a first area from second image data of the second camera module 120. In the driving preparation operation for the first camera module 110, the processor 210 may move the first FOV of the first camera module 110 to correspond to the first area. After the driving preparation operation for the first camera module 110 is completed, the processor 210 may move the first FOV of the first camera module 110 while tracking the first object, and generate an output image from first image data.

Figure 3:
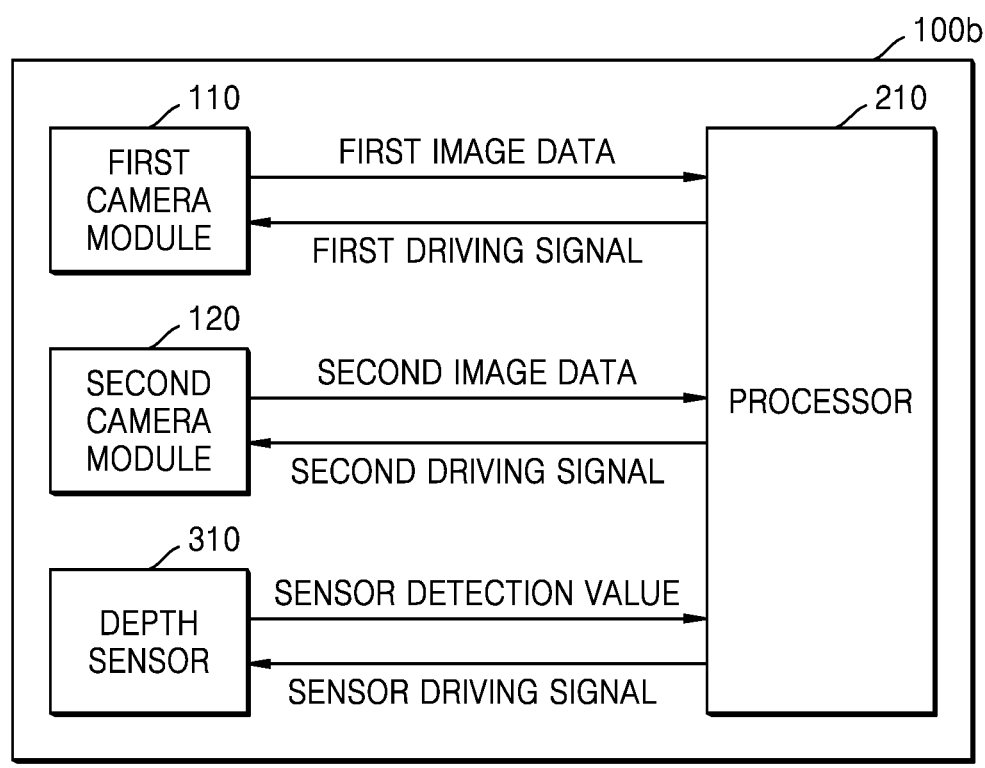
FIG. 3 illustrates a structure of an electronic device according to an embodiment of the disclosure.

FIG. 3 illustrates a structure of an electronic device according to an embodiment of the disclosure.

According to an embodiment of the disclosure, an electronic device 100*b* may include the first camera module 110, the second camera module 120, the processor 210, and a depth sensor 310.

In FIG. 3, descriptions about configurations overlapping with those of the embodiment of FIG. 2 will be omitted, and the following description will be given based on differences between the embodiments of FIGS. 2 and 3.

The electronic device 100*b* of FIG. 3 may further include the depth sensor 310, compared with the electronic device 100*a* of FIG. 2. The depth sensor 310 may be a sensor for measuring a distance to an object. The depth sensor 310 may be implemented as one of various kinds of sensors based on a time of flight (TOF) method, and for example, the depth sensor 310 may be implemented as an ultrasonic sensor, an infrared sensor, a LIDAR sensor, a RADAR sensor, etc. According to an embodiment of the disclosure, the depth sensor 310 may be installed in some pixels of the image sensor of the first camera module 110 or the second camera module 120 and implemented. The image sensor may include a phase difference detection pixel for detecting a phase difference, and the processor 210 may measure a distance to an object by using an output value of the phase difference detection pixel.

According to another embodiment of the disclosure, the depth sensor 310 may correspond to a stereo camera. For example, the electronic device 100*b* may include two or more stereo cameras positioned on the same plane, and measure a distance to an object based on inputs of the stereo cameras. According to an embodiment of the disclosure, the stereo cameras may correspond to the first camera module 110 and the second camera module 120, without the depth sensor 310.

The depth sensor 310 may generate a sensor detection value and output the sensor detection value to the processor 210. The processor 210 may control the depth sensor 310 by generating a sensor driving signal. The processor 210 may measure a distance to an object by using the sensor detection value. The processor 210 may measure a distance to a first object, and calculate an angular velocity of the first object based on the distance to the first object and a moving distance of the first object in image data. The processor 210 may determine whether the first object will leave the first FOV of the first camera module 110 based on the angular velocity of the first object. When the angular velocity of the first object is higher than a moving velocity of the angle of view of the first camera module 110, the processor 210 may determine that the first object will leave the first FOV of the first camera module 110.

Figure 4:
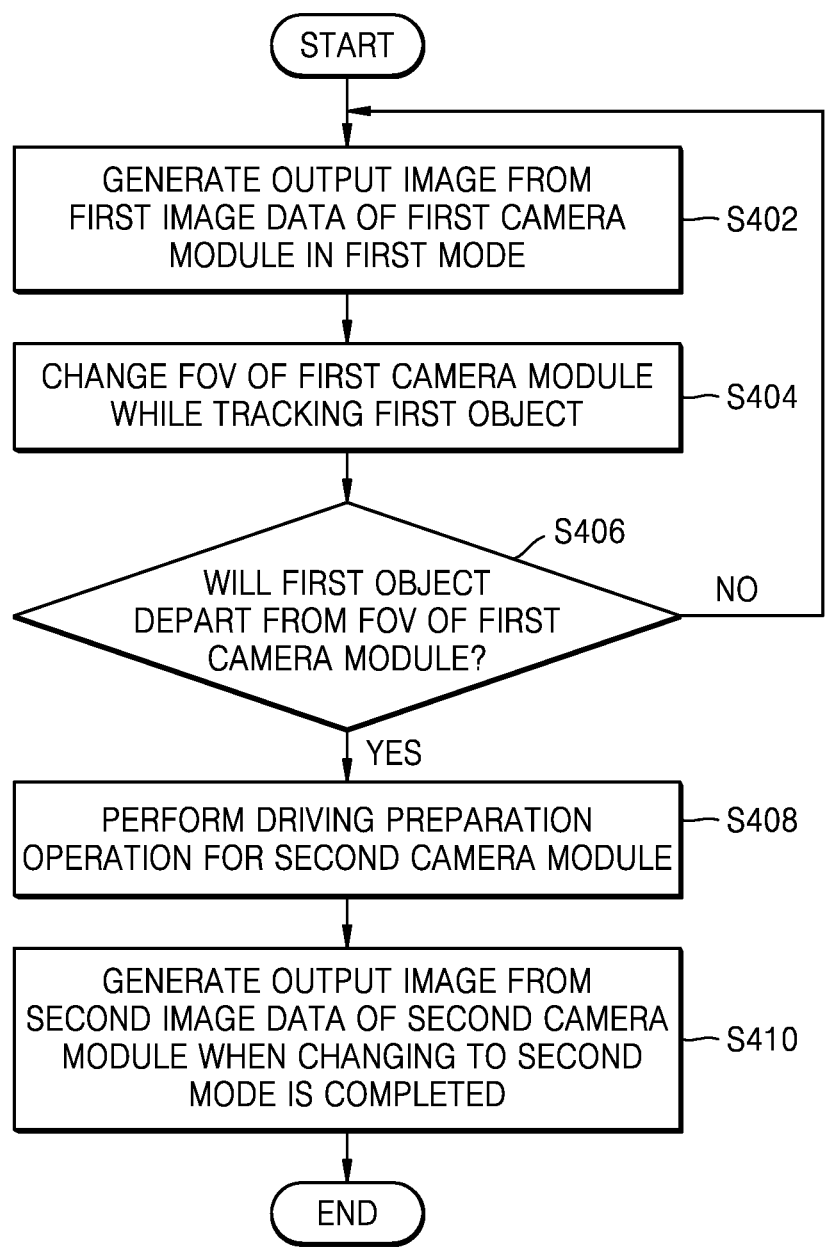
FIG. 4 is a flowchart illustrating an electronic device control method according to an embodiment of the disclosure.

FIG. 4 is a flowchart illustrating an electronic device control method according to an embodiment of the disclosure.

The electronic device control method according to an embodiment of the disclosure may be performed by various electronic devices including two camera modules and a processor. The disclosure will be described based on an embodiment of performing the electronic device control method in the electronic device 100 according to embodiments of the disclosure. The electronic device control method according to disclosed embodiments of the disclosure is not limited to being performed by the electronic device 100 described in the disclosure, and may be performed by various types of electronic devices.

In operation S402, an electronic device may generate an output image from first image data of a first camera module in a first mode. In the first mode, the first camera module may be activated to generate the first image data and output the first image data to a processor, and a second camera module may be deactivated.

In operation S404, the electronic device may change a FOV of the first camera module while tracking a moving first object. The electronic device may detect the first object from the first image data and track the first object. The electronic device may track the first object by using a preset object tracking algorithm. The electronic device may set a first FOV including the first object, and move the first FOV by tracking the first object.

In operation S406, the electronic device may determine whether the first object will leave the first FOV of the first camera module. When a moving velocity of the first object is higher than that of the first camera module, when a moving path of the first object is expected to leave a FOV movable range of the first camera module, or when a size of the first object in the first image data is expected to become larger than that of the first FOV, the electronic device may determine that the first object will leave the first FOV.

When the electronic device determines that the first object will leave the first FOV of the first camera module, in operation S406, the electronic device may perform a driving preparation operation for a second camera module in operation S408. According to an embodiment of the disclosure, the second camera module may be deactivated in the first mode. However, when the first object is expected to leave the first FOV of the first camera module, the electronic device may perform a driving preparation operation for changing a driving operation of the second camera module to a second mode, to change the driving operation of the second camera module from the first mode to the second mode and activate the second camera module. According to an embodiment of the disclosure, the driving preparation operation may include at least one or combination of an operation of supplying power and an enable signal to the second camera module being in a turned-off state, an operation of increasing a frame rate of the second camera module, an operation of adjusting a brightness value of the second camera module 120 to correspond to appropriate exposure, or an operation of setting a parameter value of the second camera module.

In operation S410, when the driving preparation operation for the second camera module is completed and accordingly, changing the driving operation of the electronic device to the second mode is completed, the electronic device may generate an output image from second image data of the second camera module. According to an embodiment of the disclosure, the electronic device may determine whether changing the driving operation of the second camera module to the second mode has been completed, by checking a power state, a frame rate, a brightness value, or a parameter value of the second camera module. For example, the electronic device may determine a first area corresponding to the first FOV of the first camera module from the second image data, and crop the first area from the second image data to generate an output image. Also, in the second mode, the electronic device may move the first area while tracking the first object, and crop the first area to generate an output image.

Figure 5:
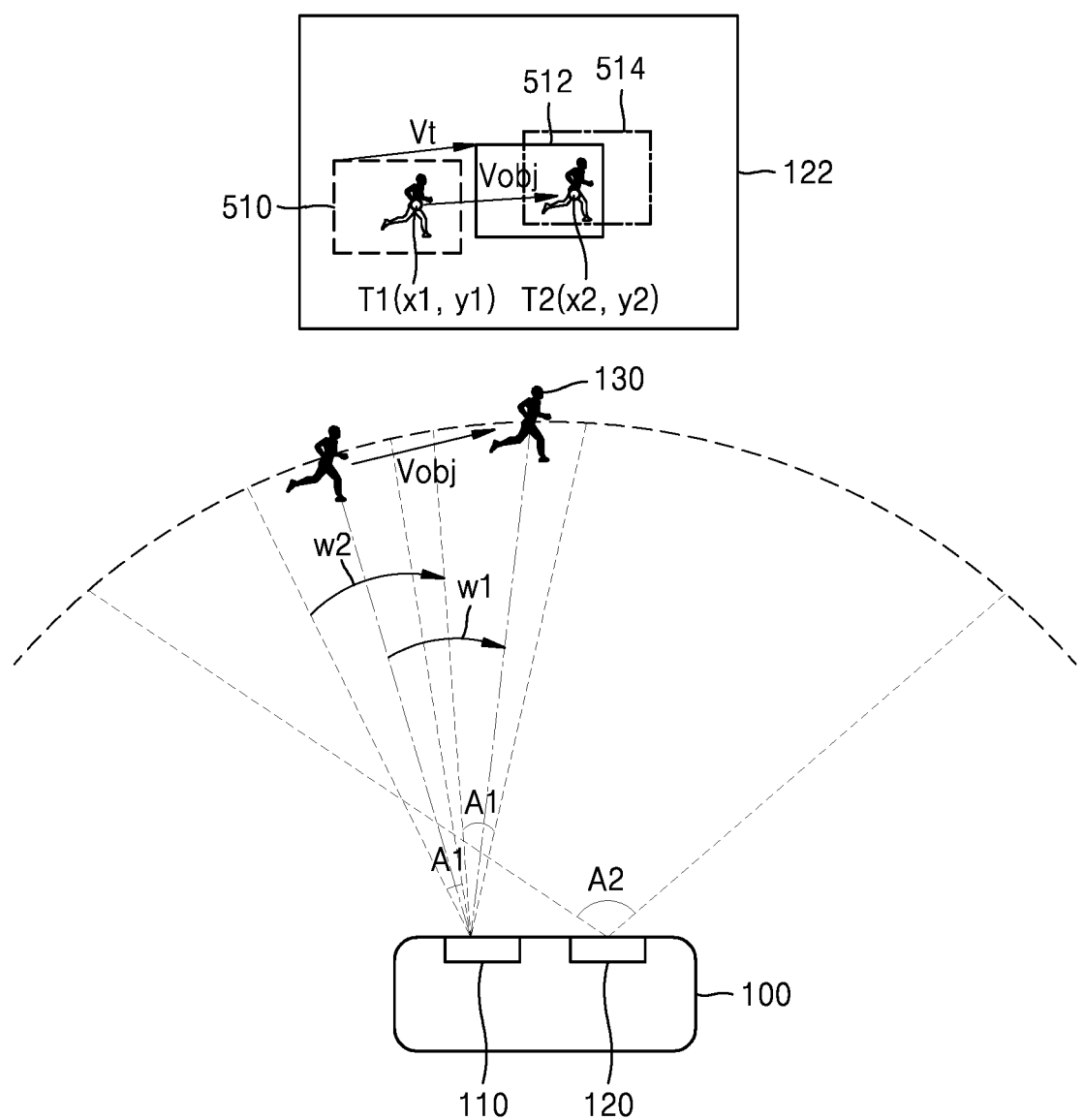
FIG. 5 illustrates a case in which a first object is expected to leave a field of view (FOV) of a first camera module, according to an embodiment of the disclosure.

FIG. 5 illustrates a case in which a first object is expected to leave a FOV of a first camera module, according to an embodiment of the disclosure.

According to an embodiment of the disclosure, when a moving velocity Vobj of a first object 130 is higher than a moving velocity Vt of a first angle A1 of view of the first camera module 110, the processor 210 may determine that the first object 130 is expected to leave a first FOV of the first camera module 110.

According to an embodiment of the disclosure, the processor 210 may calculate the moving velocity Vobj of the first object 130 based on first image data or second image data. When the processor 210 operates in a first mode, the processor 210 may detect the first object 130 from first image data, and calculate a location of the first object 130 over time. The processor 210 may determine the location of the first object 130 over time, based on the moving speed Vt of the first angle A1 of view and a location of the first object 130 in the first image data. When the processor 210 operates in a second mode, the processor 210 may detect the first object 130 from the second image data, and calculate a location of the first object 130 over time. The processor 210 may calculate the moving velocity Vobj of the first object 130, based on the location of the first object 130 over time, calculated based on the first image data or the second image data. The processor 210 may define coordinates of the first object 130 based on a center or a representative point of the first object 130. For example, the processor 210 may define coordinates T1(x1, y1) at time t1 based on a representative point of the center of the first object 130, and define coordinates T2(x2, y2) at time t2. The coordinates T1(x1, y1) and T2(x2, y2) may be defined on a coordinate system defined in an input image corresponding to the first image data or the second image data. For example, when an input image is a full high definition (FHD) image, the processor 210 may define coordinates on a coordinate system that defines coordinates of a left and upper end of the input image as (0, 0) and coordinates of a right and lower end of the input image as (1919, 1079). The moving velocity Vobj of the first object 130 may be defined as a value obtained by dividing a distance between the coordinates T1(x1, y1) at the time t1 and the coordinates T2(x2, y2) at the time t2 by a time difference between the time t1 and the time t2.

Also, the processor 210 may calculate a moving velocity Vt of the first FOV of the first camera module 110. The processor 210 may calculate the moving velocity Vt of the first FOV, based on a zoom level of the first camera module 110 and the moving velocity Vt of the first angle A1 of view of the first camera module 110. The moving velocity Vt of the first FOV of the first camera module 110 may be obtained by referring to a hardware specification of a camera module. A hardware specification about a moving velocity of a FOV may be defined based on a certain zoom magnification (e.g., a 1× zoom level). The processor 210 may calculate a moving velocity of a FOV based on a current zoom level by multiplying a hardware specification about a moving velocity of a FOV by the current zoom level. For example, when a hardware specification is defined based on a FHD image at a 1× zoom level, a FOV of a FHD image at a 2× zoom level may be ¼ with respect to an area of the 1× zoom level and ½ with respect to a length of the 1× zoom level, with the same resolution of FHD. Therefore, a moving velocity of a FOV of a FHD image at a 2× zoom level may be calculated as two times of the moving velocity of a FOV at a 1× zoom level. When the first FOV is at a location 510 at the time t1 and at a location 512 at the time t2, the processor 210 may define a value obtained by dividing a distance between the locations 510 and 512 of the first FOV by a time difference between the time t1 and the time t2, as the moving velocity Vt of the first FOV.

According to another embodiment of the disclosure, a moving velocity of a FOV may be defined as an angular velocity. The processor 210 may compare an angular velocity of an object with an angular velocity of an angle of view of the first camera module 110 based on a hardware specification defined as an angular velocity. In this case, the processor 210 may compare the angular velocity of the object with the angular velocity of the angle of view of the first camera module 110, without considering a zoom level. The processor 210 may calculate the angular velocity of the object by converting the number of pixels moved per hour in an entire angle-of-view range of first image data into an angular velocity.

The processor 210 may compare the moving velocity Vobj of the first object 130 with the moving velocity Vt of the first FOV of the first camera module 110. When the moving velocity Vobj of the first object 130 is higher than the moving velocity Vt of the first FOV, the processor 210 may determine that the first object 130 is expected to leave the first FOV of the first camera module 110.

According to an embodiment of the disclosure, the processor 210 may calculate an angular velocity w1 of the first object 130, and compare the angular velocity w1 of the first object 130 with an angular velocity w2 of the first angle A1 of view. The processor 210 may calculate the angular velocity w1 of the first object 130 with respect to an apex of the first angle A1 of view. According to an embodiment of the disclosure, the processor 210 may calculate the angular velocity w1 of the first object 130 based on a distance to the first object 130 and a location of the first object 130 on image data. The location of the first object 130 on the image data may be a location of the first object 130 on the first image data or a location of the first object 130 on the second image data. According to another embodiment of the disclosure, the processor 210 may include the depth sensor 310, calculate a location of the first object 130 in a three-dimensional space, and calculate the angular velocity w1 of the first object 130 based on the location of the first object 130 in the three-dimensional space. For example, the processor 210 may calculate a depth map for a FOV, and calculate a location of the first object 130 in a three-dimensional space based on the depth map. When the angular velocity w1 of the first object 130 is higher than the angular velocity w2 of the first angle A1 of view of the first camera module 110, the processor 210 may determine that the first object 130 is expected to leave the first FOV of the first camera module 110.

When the first object 130 is expected to leave the first FOV of the first camera module 110, the processor 210 may perform a driving preparation operation of changing a driving operation of the second camera module 120 to the second mode. Also, after driving preparation of the second camera module 120 is completed, the processor 210 may operate in the second mode. In the second mode, the processor 210 may generate an output image by cropping an area 514 corresponding to the first FOV of the first camera module 110 from second image data of the second camera module 120.

According to an embodiment of the disclosure, the processor 210 may calculate an acceleration of the first object 130, and predict whether the first object 130 will leave the first FOV of the first camera module 110 based on the velocity and acceleration of the first object 130. For example, when the velocity of the first object 130 increases, the processor 210 may predict that the velocity of the first object 130 will become higher than the moving velocity of the first FOV of the first camera module 110, and predict that the first object 130 will leave the first FOV. A configuration of applying acceleration of the first object 130 may also be applicable to an embodiment of using an angular velocity of the first object 130 and an angular velocity of the first angle A1 of view.

Figure 6:
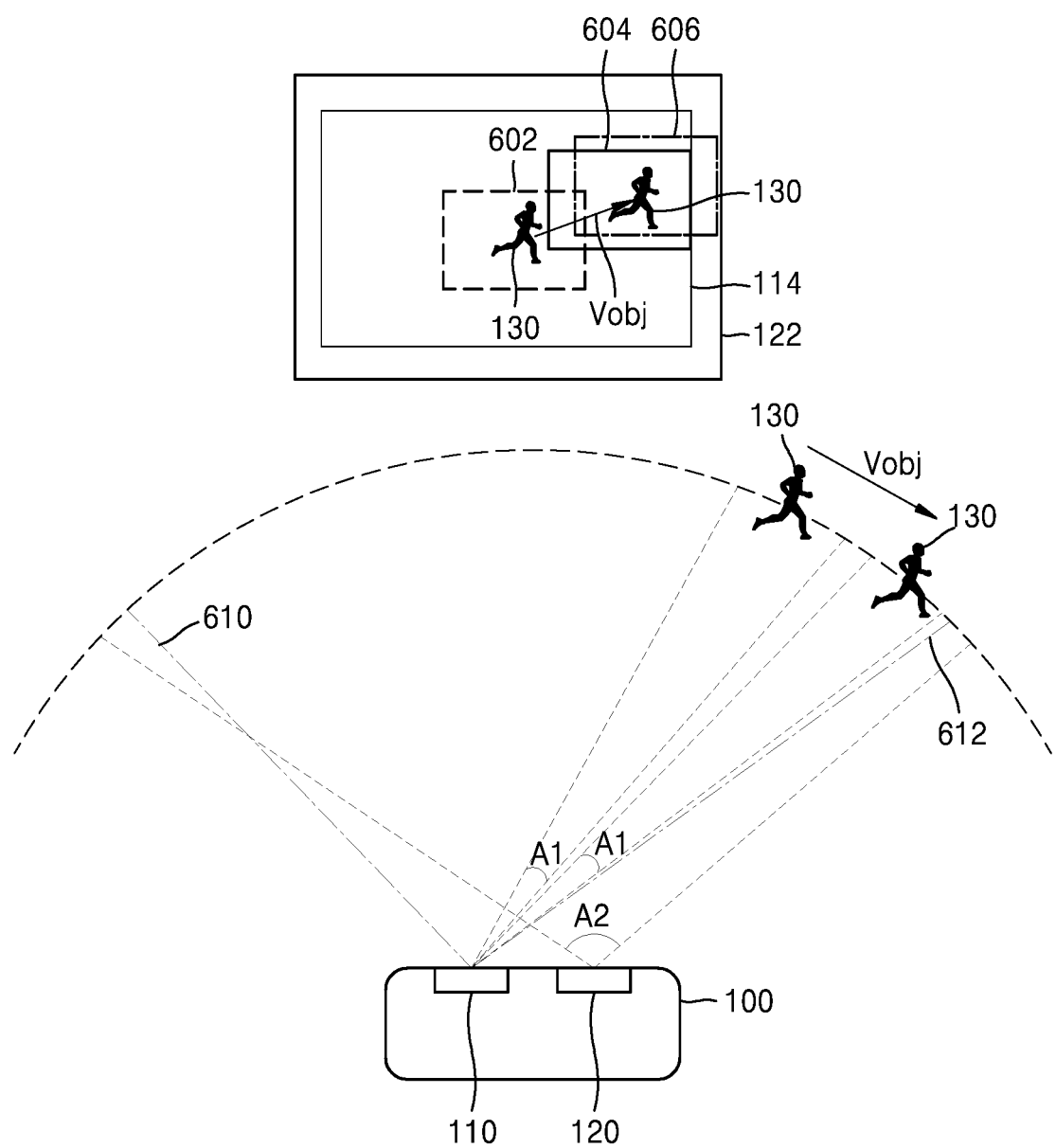
FIG. 6 is a view for describing a case in which a first object is expected to leave a FOV movable range of a first camera module, according to an embodiment of the disclosure.

FIG. 6 is a view for describing a case in which a first object is expected to leave a FOV movable range of a first camera module, according to an embodiment of the disclosure.

According to an embodiment of the disclosure, when the first object 130 is expected to leave a FOV movable range 114 of the first camera module 110, the processor 210 may determine that the first object 130 is expected to leave the first FOV of the first camera module 110. For example, the processor 210 may move the first FOV to a location 602 and a location 604 sequentially while tracking the first object 130. However, when the first object 130 is expected to reach a boundary of the FOV movable range 114 of the first camera module 110 within a reference time period by considering a moving path and velocity of the first object 130, the processor 210 may predict that the first object 130 will leave the first FOV of the first camera module 110.

According to an embodiment of the disclosure, the processor 210 may determine whether the first object 130 will leave the FOV movable range 114 of the first camera module 110, based on first image data. For example, the processor 210 may determine whether the first object 130 will leave the FOV movable range 114 of the first camera module 110, based on a location of the first object 130 on the first image data and boundaries 610 and 612 of a movable range of a first angle A1 of view of the first camera module 110. According to an embodiment of the disclosure, the processor 210 may predict a path of the first object 130, based on a location, velocity, and direction of the first angle A1 of view of the first object 130 on the first image data. For example, the processor 210 may determine whether the first object 130 will reach the boundary 610 or 612 of the FOV movable range 114 within the reference time period, based on the location and velocity of the first object 130.

According to another embodiment of the disclosure, the processor 210 may determine whether the first object 130 will reach the boundary 610 or 612 of the FOV movable range 114 of the first camera module 110, based on a location of the first object 130 in a three-direction space.

According to an embodiment of the disclosure, the electronic device 100 may include the depth sensor 310, and the processor 210 may calculate a depth map by using a sensor detection value of the depth sensor 310. The processor 210 may calculate a location of the first object 130 in the three-directional space based on the depth map.

According to an embodiment of the disclosure, the processor 210 may determine a depth of the first object 130 and whether the first object 130 will reach the boundary 610 or 612 of the FOV movable range 114 of the angle A1 of view of the first camera module 110 at the corresponding depth. For example, when the processor 210 determines that the first object 130 will reach the boundary 610 or 612 of the FOV movable range 114 of the angle A1 of view of the first camera module 110 within the reference time period, the processor 210 may determine that the first object 130 will leave the FOV movable range 114 of the first camera module 110 within the reference time period.

When the processor 210 determines that the first object 130 departs from the FOV movable range 114 of the first camera module 110, the processor 210 may perform a driving preparation operation of changing a driving operation of the second camera module 120 to the second mode. Also, after driving preparation of the second camera module 120 is completed, the processor 210 may operate in the second mode. In the second mode, the processor 210 may generate an output image by cropping an area 606 corresponding to the first FOV of the first camera module 110 from second image data of the second camera module 120.

Figure 7:
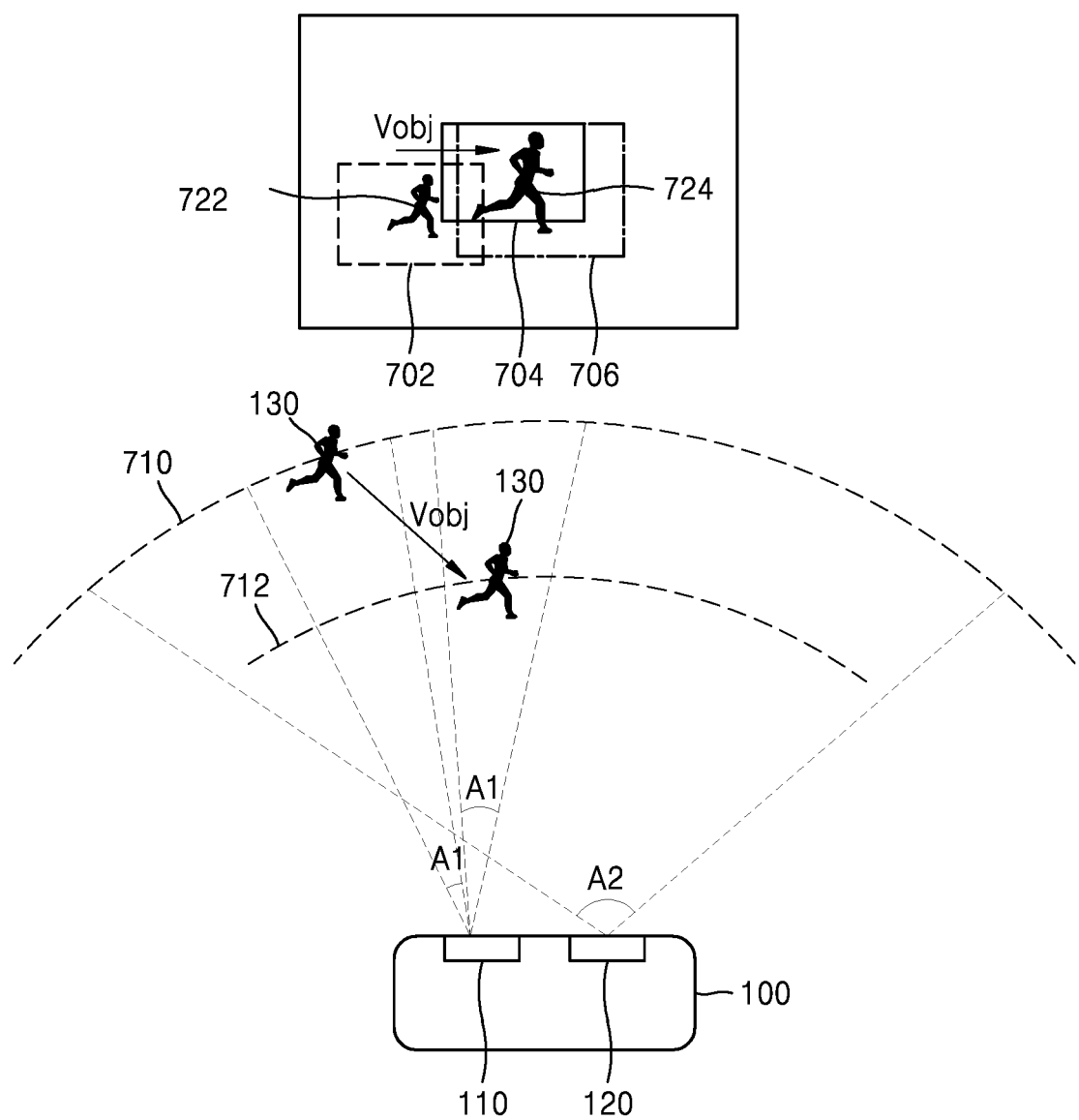
FIG. 7 is a view for describing a case in which a size of a first object in first image data is expected to become larger than a FOV of a first camera module, according to an embodiment of the disclosure.

FIG. 7 is a view for describing a case in which a size of a first object in first image data is expected to become larger than a FOV of a first camera module, according to an embodiment of the disclosure.

According to an embodiment of the disclosure, when a size of a first object 130 in first image data is expected to become larger than a size of a first FOV of the first camera module 110, the processor 210 may determine that the first object 130 is expected to leave the first FOV of the first camera module 110. The processor 210 may move the first FOV to a location 702 and a location 704 sequentially while tracking the first object 130. However, as a distance between the first object 130 and the electronic device 100 is shorter, a size of the first object 130 in first image data may increase. For example, when the first object 130 being at a first distance 710 to the electronic device 100 approaches the electronic device 100 to move to a second distance 712 to the electronic device 100, a size of the first object 130 in first image data may increase. Accordingly, the first object 130 in the first image data may appear as 722 at the first distance 710 corresponding to a first time point, and appear as 724 at the second distance 712 corresponding to a second time point. At the first time point, a location 702 may be set, and, at the second time, a location 704 may be set. However, as an object 724 in the first image data at the second time point begins to leave the location 704, the processor 210 may determine that the first object 130 is expected to leave the first FOV of the first camera module 110 within a reference time period.

According to an embodiment of the disclosure, the processor 210 may determine whether the first object 130 will leave a FOV movable range 114 of the first camera module 110, based on the first image data. For example, the processor 210 may determine whether a size of the first object 130 will become larger than that of the first FOV of the first camera module 110, based on a size of the first object 130 in the first image data and an increase velocity in size of the first object 130 in the first image data.

According to an embodiment of the disclosure, the processor 210 may predict a change in size of the first object 130, based on at least one of a location, path, or increase velocity in size of the first object 130 in the first image data.

For example, the processor 210 may determine whether a size of the first object 130 in the first image data will become larger than that of the first FOV within the reference time period, based on at least one of a location, path, or increase velocity in size of the first object 130 in the first image data. As another example, the processor 210 may determine whether an edge of the first object 130 in the first image data will reach a boundary of the first FOV within the reference time period, based on at least one of a location, path, or increase velocity in size of the first object 130. For example, when the processor 210 determines that an edge of the first object 130 in the first image data will reach a boundary of the first FOV within the reference time period, the processor 210 may determine that the size of the first object 130 in the first image data will become larger than that of the first FOV within the reference time period.

According to another embodiment of the disclosure, the processor 210 may determine whether a size of the first object 130 will become larger than that of the first FOV of the first camera module 110, based on a location of the first object 130 in a three-dimensional space. The electronic device 100 may include the depth sensor 310, and the processor 210 may calculate a depth map by using a sensor detection value of the depth sensor 310. The processor 210 may calculate a location of the first object 130 in the three-dimensional space, based on the depth map. According to an embodiment of the disclosure, the processor 210 may determine whether a size of the first object 130 in the first image data will become larger than that of the first FOV, based on at least one of a moving path, a moving velocity, or a velocity in depth direction of the first object 130 in the three-dimensional space. For example, when the processor 210 determines that a size of the first object 130 in the first image data will become larger than that of the first FOV within the reference time period, the processor 210 may determine that the first object 130 is expected to leave the first FOV.

When the processor 210 determines that the size of the first object 130 in the first image data is expected to become larger than that of the first FOV, the processor 210 may perform a driving preparation operation of changing a driving operation of the second camera module 120 to the second mode. Also, when driving preparation of the second camera module 120 is completed, the processor 210 may operate in the second mode. In the second mode, the processor 210 may generate an output image by cropping an area 706 corresponding to the first FOV of the first camera module 110 from second image data of the second camera module 120. The processor 210 may set a crop area corresponding to the first FOV of the first camera module 110 in a first frame in which the first camera module 110 is switched to the second camera module 120, and, as a size of the first object 130 in the second image data increases, the processor 210 may increase a size of the crop area.

Figure 8:
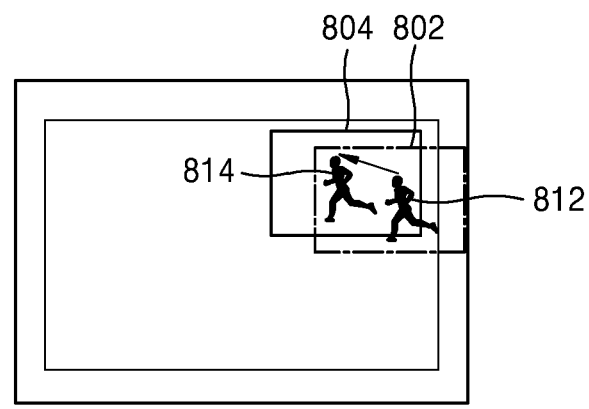
FIG. 8 is a view for describing a case in which a first object enters a FOV of a first camera module, according to an embodiment of the disclosure.
Figure 8:
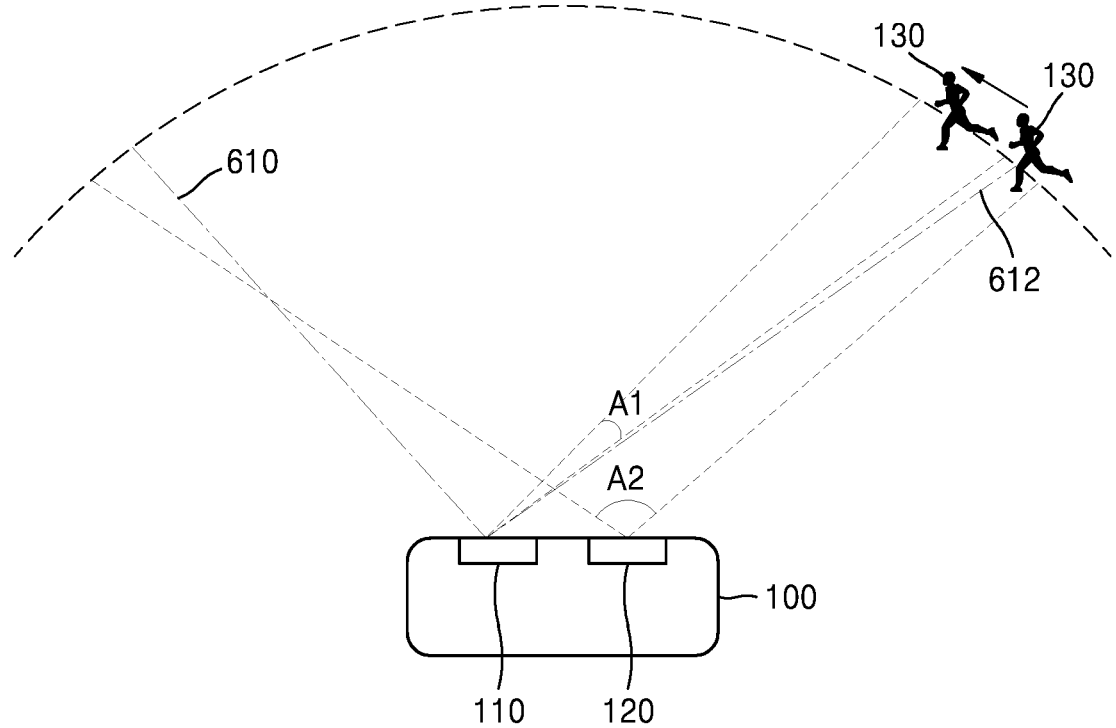

FIG. 8 is a view for describing a case in which a first object enters a FOV of a first camera module, according to an embodiment of the disclosure.

According to an embodiment of the disclosure, when the electronic device 100 determines that the first camera module 110 is capable of tracking the first object 130, while operating in the second mode, the electronic device 100 may perform a driving preparation operation for the first camera module to change a driving operation of the first camera module 110 from the second mode to the first mode. According to an embodiment of the disclosure, the electronic device 100 may determine whether the first camera module 110 is capable of tracking the first object, based on at least one of a velocity of the first object 130, a size of the first object 130 in second image data, or a location of the first object 130 in the second image data.

According to an embodiment of the disclosure, a case in which it is determined that the first camera module 110 is capable of tracking the first object 130 may be a case in which a velocity of the first object 130 becomes lower than a highest moving velocity of the FOV of the first camera module 110. For example, when a velocity of the first object 130 is higher than the highest moving velocity of the first FOV of the first camera module 110, the electronic device 100 may determine that the first camera module 110 is incapable of tracking the first object 130, and, when a velocity of the first object 130 becomes lower than the highest moving velocity of the first FOV of the first camera module 110, the electronic device 100 may determine that the first camera module 110 is capable of tracking the first object 130.

According to another embodiment of the disclosure, a case in which it is determined that the first camera module 110 is capable of tracking the first object 130 may be a case in which an angular velocity of the first object 130 becomes lower than a highest moving velocity of an angle of view of the first camera module 110. For example, the first camera module 110 may measure a distance to the first object 130 by using a stereo camera, a depth sensor, etc. The electronic device 100 may measure an angular velocity of the first object 130 based on the distance to the first object 130 and the location of the first object 130 in second image data. According to an embodiment of the disclosure, when an angular velocity of the first object 130, which is higher than a highest angular velocity of the first camera module 110, changes to an angular velocity that is lower than the highest angular velocity, the electronic device 100 may determine that the first camera module 110 is capable of tracking the first object 130.

According to another embodiment of the disclosure, a case in which it is determined that the first camera module 110 is capable of tracking the first object 130 may be a case in which the first object 130 enters a FOV movable range of the first camera module 110. For example, when the first object 130, which is in the outside of a boundary 610 or 612 of the FOV movable range of the first camera module 110, enters the inside of the boundary 610 or 612 of the FOV movable range of the first camera module 110, the electronic device 100 may determine that the first object 130 has entered the FOV movable range of the first camera module 110. In this case, the electronic device 100 may determine that the first camera module 110 is capable of tracking the first object 130.

According to another embodiment of the disclosure, a case in which it is determined that the first camera module 110 is capable of tracking the first object 130 may be a case in which a size of the first object 130 in second image data becomes smaller than a reference size. The electronic device 100 may calculate a size of the first object 130 from the second image data. The electronic device 100 may calculate a size of the first object 130 as a size of a box corresponding to the first object 130 in the second image data. According to an embodiment of the disclosure, when a size of the first object 130 in second image data, which is larger than a reference size corresponding to a size of the first FOV of the first camera module 110, changes to a size that is smaller than the reference size, the electronic device 100 may determine that the first camera module 110 is capable of tracking the first object 130.

According to an embodiment of the disclosure, when the electronic device 100 determines that the first camera module 110 is capable of tracking the first object 130, the electronic device 100 may consider a velocity (or an angular velocity) of the first object 130, a size (a depth) of the first object 130 in the second image data, and whether the first object 130 is within the FOV movable range of the first camera module 110. For example, the electronic device 100 may determine whether three conditions related to the velocity, the size, and the FOV movable range are satisfied. When all of the three conditions are satisfied, the electronic device 100 may determine that the first camera module 110 is capable of tracking the first object 130, and, when one or more conditions of the three conditions are not satisfied, the electronic device 100 may determine that the first camera module 110 is incapable of tracking the first object 130.

When the electronic device 100 determines that the first camera module 110 is capable of tracking the first object 130, the electronic device 100 may perform a driving preparation operation of changing a driving operation of the first camera module 110 to the first mode. Also, when driving preparation of the first camera module 110 is completed, the electronic device 100 may operate in the first mode. In the first mode, the electronic device 100 may set a first FOV corresponding to a crop area of the second camera module 120 from first image data of the first camera module 110, and move the first FOV while tracking the first object 130. For example, when the driving preparation operation for the first camera module 110 is completed while the electronic device 100 crops an area 802 from second image data in the second mode, the electronic device 100 may operate in the first mode. Then, the electronic device 100 may set a first FOV corresponding to the area 802, and move the first FOV to an area 804 while tracking a first object 812 and 814 from first image data.

Figure 9:
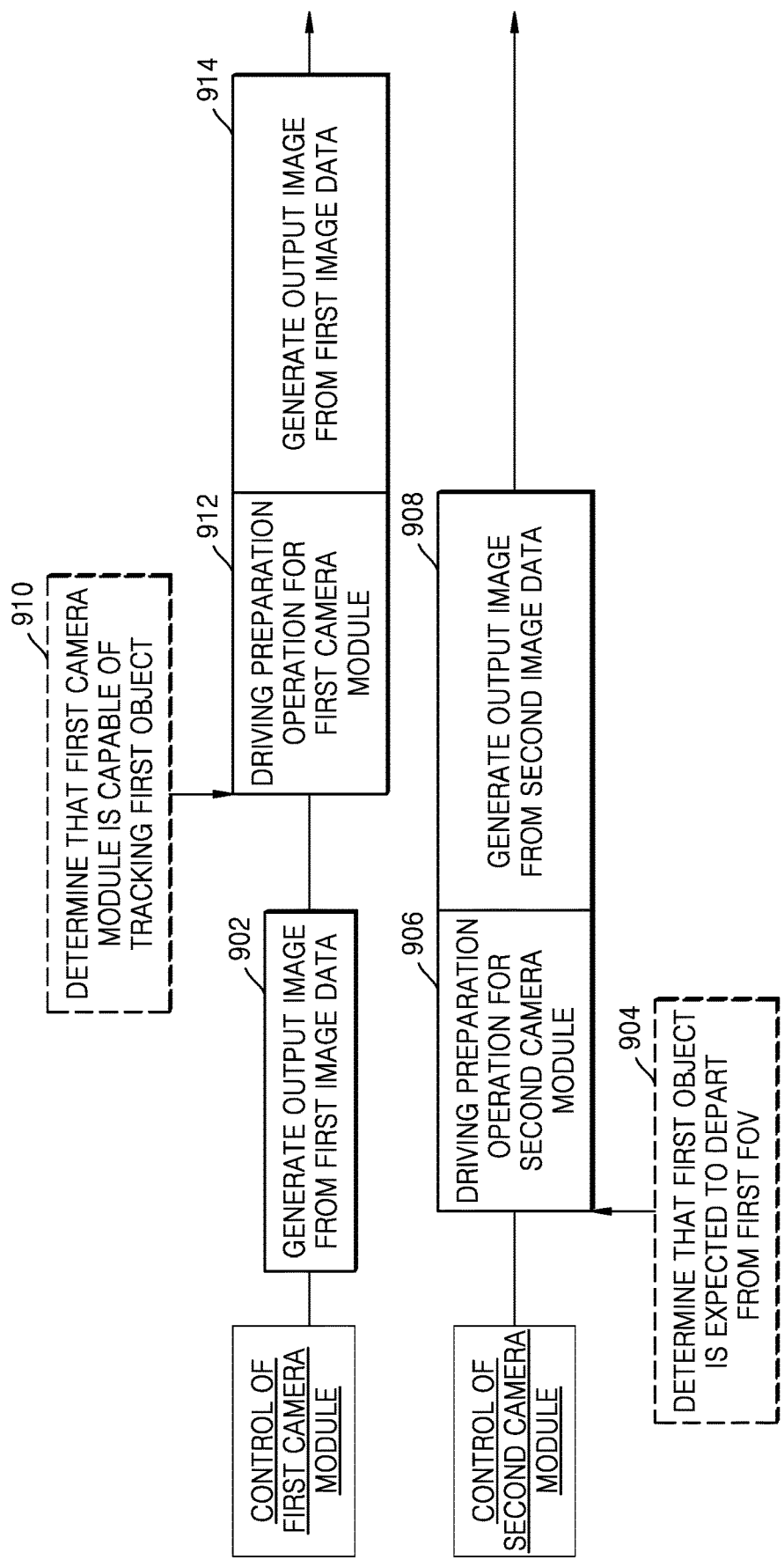
FIG. 9 illustrates operations of controlling a first camera module and a second camera module, according to an embodiment of the disclosure.

FIG. 9 illustrates operations of controlling a first camera module and a second camera module, according to an embodiment of the disclosure.

According to an embodiment of the disclosure, the processor 210 may control the first camera module 110 and the second camera module 120. The processor 210 may generate driving signals for controlling operations of the first camera module 110 and the second camera module 120 while operating in the first mode and the second mode.

The processor 210 may generate an output image from first image data while operating in the first mode, in operation 902. In the first mode, the processor 210 may control the first camera module 110 to track a first object based on the first image data.

Also, while the processor 210 operates in the first mode, the processor 210 may determine whether the first object is expected to leave a first FOV of the first camera module 110. When the processor 210 determines that the first object is expected to leave the first FOV of the first camera module 110 in operation 904, the processor 210 may perform a driving preparation operation for the second camera module 120, in operation 906. According to an embodiment of the disclosure, the driving preparation operation for the second camera module 120 may be an operation of changing a driving operation of the second camera module 120 to the second mode, and may include at least one of an operation of supplying power to the second camera module 120, an operation of supplying an enable signal to the second camera module 120, an operation of increasing a frame rate of the second camera module 120, an operation of causing a brightness value of the second camera module 120 to be identical to a brightness value of the first camera module 110, an operation of setting a parameter value of the second camera module 120, or an operation of determining a crop area of second image data based on calibration data.

When the driving preparation operation for the second camera module 120 is completed, the processor 210 may change a driving operation of the electronic device 100 to the second mode, and generate an output image from second image data of the second camera module 120, in operation 908. According to an embodiment of the disclosure, the processor 210 may crop an area corresponding to the first FOV of the first camera module 110 from the second image data, determine a crop area while tracking the first object, and generate an output image.

The processor 210 may determine whether the first camera module 110 is capable of tracking the first object, while operating in the second mode. When the processor 210 determines that the first camera module 110 is capable of tracking the first object in operation 910, the processor 210 may perform a driving preparation operation for the first camera module 110, in operation 912. The driving preparation operation for the first camera module 110 may be an operation of changing a driving operation of the first camera module 110 to the first mode, and may include at least one of an operation of supplying power to the first camera module 110, an operation of supplying an enable signal to the first camera module 110, an operation of increasing a frame rate of the first camera module 110, an operation of causing a brightness value of an exposure setting of the first camera module 110 to be identical to a brightness value of an exposure setting of the second camera module 120, an operation of setting a parameter value of the first camera module 110, an operation of setting a FOV of the first camera module 110 to correspond to a crop area of second image data, or an operation of adjusting a white balance (WB) of the first camera module 110 to correspond to a white balance of the second camera module 120.

According to an embodiment of the disclosure, while the processor 210 generates an output image from second image data of the second camera module 120 in the second mode, the first camera module 110 may move an angle of view while tracking an object. However, because a moving velocity of the angle of view of the first camera module 110 is lower than that of the object in the second mode, the angle of view of the first camera module 110 may fail to fully track the object. When the processor 210 determines that the first camera module 110 is capable of tracking the object, while operating in the second mode, the processor 210 may perform a tracking operation of the first camera module 110 in the first mode, in succession to a tracking operation of the first camera module 110 in the second mode.

When the driving preparation operation for the first camera module 110 is completed, the processor 210 may change a driving operation of the electronic device 100 to the first mode, and generate an output image from image data of the first camera module 110, in operation 914. The processor 210 may move the angle of view of the first camera module 110 to track the first object, and generate an output image from the first image data.

Figure 10:
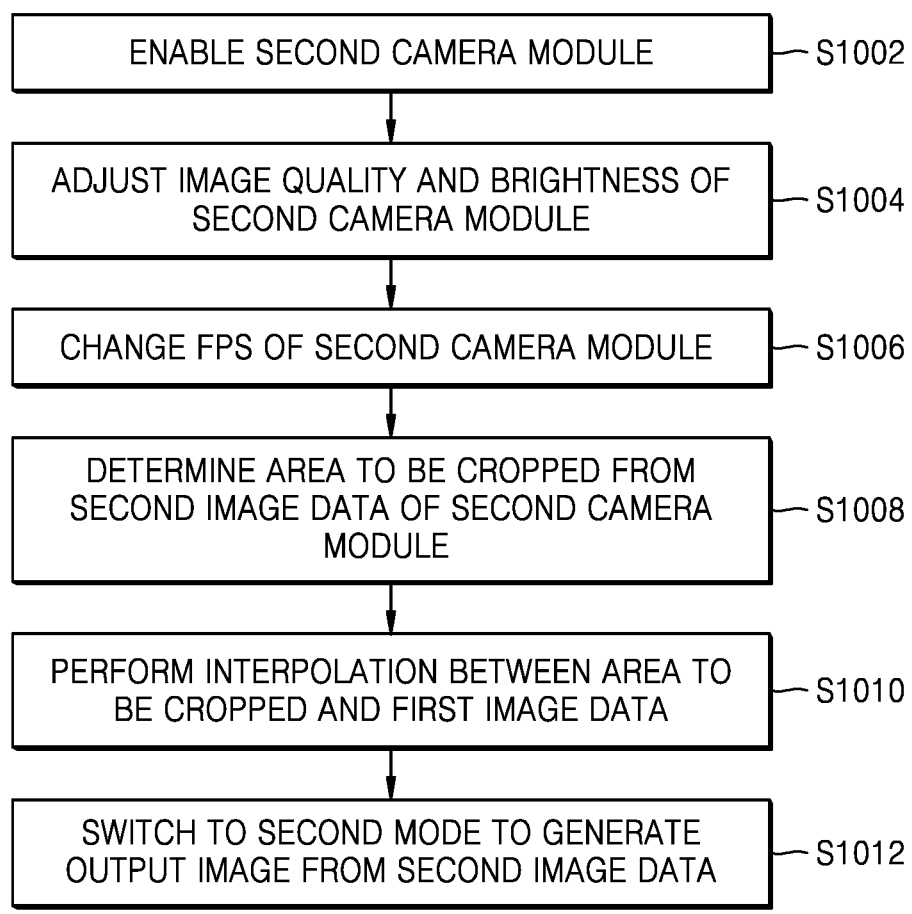
FIG. 10 is a flowchart illustrating a driving preparation operation for a second camera module, according to an embodiment of the disclosure.

FIG. 10 is a flowchart illustrating a driving preparation operation for a second camera module, according to an embodiment of the disclosure.

According to an embodiment of the disclosure, the second camera module 120 may operate in a sleep mode in which no power or minimum power is supplied in the first mode. When a driving preparation operation for the second camera module 120 starts, the processor 210 may supply an enable signal to the second camera module 120 to activate the second camera module 120, in operation S1002.

When the second camera module 120 is activated, the processor 210 may adjust image quality and brightness of the second camera module 120, in operation S1004. The processor 210 may adjust the image quality and brightness of the second camera module 120 by adjusting a gain value and an exposure value of the image sensor of the second camera module 120. The processor 210 may adjust the image quality or brightness of the second camera module 120 such that the image quality or brightness of the second camera module 120 are identical to image quality or brightness of the first camera module 110.

Then, the processor 210 may change a frame rate of the second camera module 120, in operation S1006. The second camera module 120 may operate at a low frame rate in the first mode, or may perform no frame generation operation. The processor 210 may increase a frame rate of the second camera module 120, in the driving preparation operation for the second camera module 120. The processor 210 may adjust the frame rate of the second camera module 120 such that the frame rate of the second camera module 120 is identical to a frame rate of the first camera module 110.

Then, the processor 210 may determine a crop area to be cropped from second image data of the second camera module 120, in operation S1008. The processor 210 may calculate an area corresponding to a first FOV of the first camera module 110 from the second image data based on calibration data. The processor 210 may determine, based on a current angle-of-view location of the first camera module 110, an area of the second image data corresponding to the current angle-of-view location based on calibration data. For example, the calibration data may include information representing a relationship between FOVs or angles of view of the first camera module 110 and the second camera module 120 on a preset coordinate system. The processor 210 may calculate coordinates corresponding to a location of a first FOV of the first camera module 110 on the preset coordinate system in which calibration data is defined, and calculate an area of the second image data corresponding to the location of the first FOV. The area of the second image data corresponding to the location of the first FOV may be determined to be a crop area. The calibration data may have been stored in advance in a memory. When the crop area is determined, driving preparation of the second camera module 120 may be completed.

Then, the processor 210 may perform interpolation between data of the crop area of the second image data and the first image data, in operation S1010. The processor 210 may perform interpolation between the data of the crop area of the second image data and pixel values of the first image data, to smoothly perform switching from the first mode to the second mode. The processor 210 may perform interpolation on data of the crop area of the second image data, corresponding to a first frame appearing after switching to the second mode.

The processor 210 may generate an output image from the interpolated data of the crop area of the second image data, in operation S1012.

Figure 11:
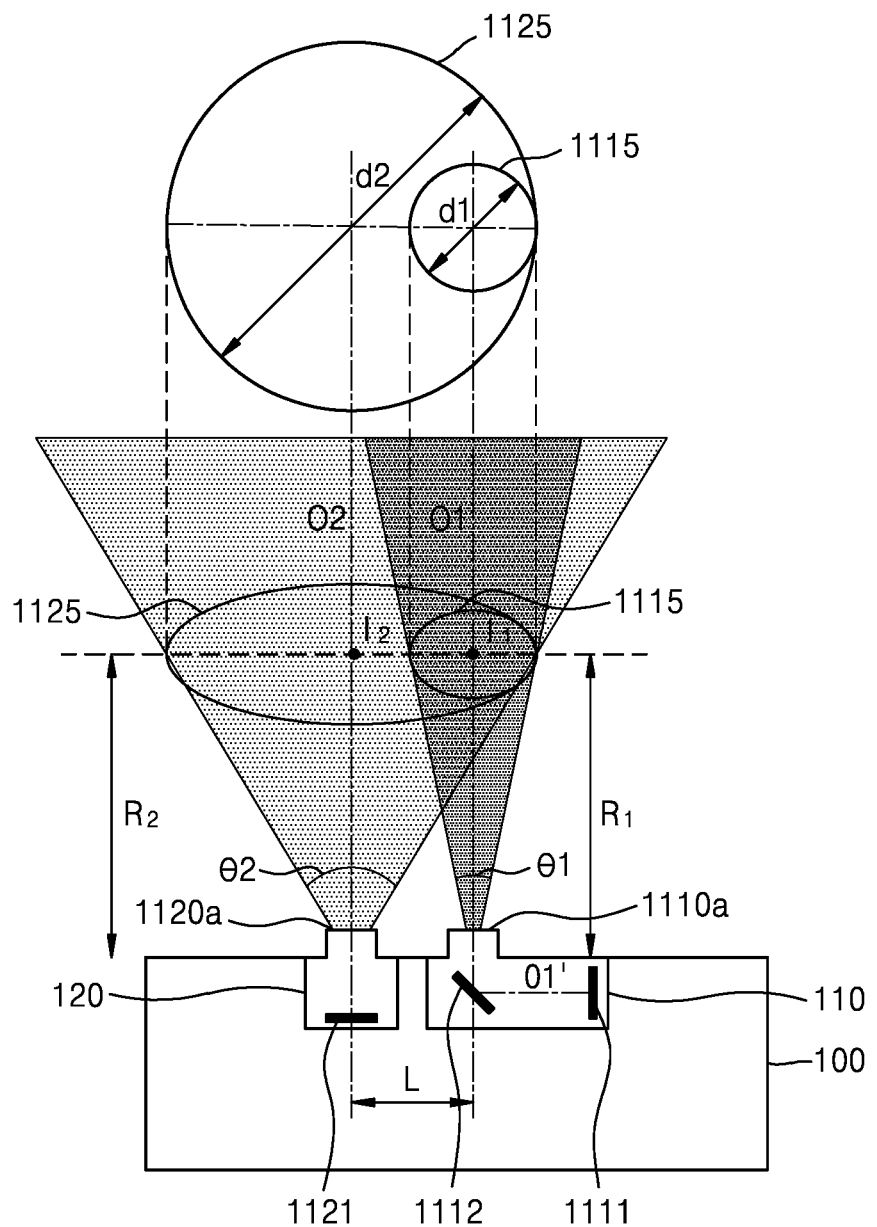
FIG. 11 illustrates an arrangement of a first camera module and a second camera module and an arrangement of FOVs, according to an embodiment of the disclosure.

FIG. 11 illustrates an arrangement of a first camera module and a second camera module and an arrangement of FOVs of the first camera module and the second camera module, according to an embodiment of the disclosure.

Referring to FIG. 11, the electronic device 100 may include the first camera module 110 and the second camera module 120. The first camera module 110 and the second camera module 120 may be spaced a designated separation distance L from each other. The first camera module 110 and the second camera module 120 may be arranged such that openings 1110a and 1120a for collecting light face in the same direction. For example, the first camera module 110 and the second camera module 120 may be in a form of a dual camera positioned on a rear surface (an opposite surface of a surface on which a display is positioned) of the electronic device 100.

The first camera module 110 may include an image sensor 1111 and a reflective member 1112. The first camera module 110 may be implemented as a reflective type optical system in which incident light is reflected by the reflective member 1112 and then incident to the image sensor 1111.

The image sensor 1111 may convert light to electronic image data through a photoelectric conversion effect. The image sensor 1111 may include a group of pixels arranged two-dimensionally, and convert light emitted from each pixel to electronic image data. The image sensor 1111 may face in a direction that is perpendicular to a surface in which the opening 1110a for receiving light is formed. Light collected through the opening 1110a may be reflected by the reflective member 1112 and then incident to the image sensor 1111.

The reflective member 1112 may reflect light entered from outside through the opening 1110a toward the image sensor 1111. The reflective member 1112 may have a fixed type of which an angle is not adjusted, or a movable or rotatable type which uses a separate driver (or actuator). The reflective member 1112 may be implemented by using a reflector, such as a mirror, a prism, etc.

According to various embodiments of the disclosure, the first camera module 110 may be a telescope camera, and have an angle θ1 of view that is smaller than a designated angle. For example, the first camera module 110 may have an angle of view that is smaller than 40°.

The first camera module 110 may form a first capture area (or a field of view (FOV)) 1115, at an object distance R1. The first capture area 1115 may have a diameter d1 that is relatively smaller than that of a second capture area 1125 formed by the second camera module 120.

The second camera module 120 may include a second image sensor 1121. The second camera module 120 may be implemented as a direct type optical system including no reflective member, unlike the first camera module 110.

The second image sensor 1121 may convert light into electronic image data through a photoelectric conversion effect. The second image sensor 1121 may include a group of pixels arranged two-dimensionally, and convert light emitted from each pixel into electronic image data. The second image sensor 1121 may face in a direction that is horizontal to a surface in which the opening 1120a for receiving light is formed. Light collected through the opening 1120a may be directly incident to the second image sensor 1121.

The second camera module 120 may be a wide angle camera, and may have a relatively great angle θ2 of view. For example, the second camera module 120 may have an angle of view of 60° to 80°.

The second camera module 120 may form a second capture area (or a field of view (FOV)) 1125 at an object distance R2. The second capture area 1125 may have a relatively greater diameter d2 than the first capture area 1115 formed by the first camera module 110.

According to an embodiment of the disclosure, the object distance R1 may be a shortest focusable distance (or a shortest photographable distance) of the first camera module 110. The first capture area 1115 of the first camera module 110, formed at the shortest focusable distance of the first camera module 110, may be included in the second capture area 1125 of the second camera module 120. According to another embodiment of the disclosure, the first capture area 1115 formed at the shortest focusable distance of the first camera module 110 may be inscribed in the second capture area 1125.

According to an embodiment of the disclosure, the first camera module 110 and the second camera module 120 may have a relationship of Equation 1 below.

$$R2 * \tan\left(\frac{\theta 2}{2}\right) \geq L + R1 * \tan\left(\frac{\theta 1}{2}\right) \qquad \text{Equation 1}$$

R1: distance between a first camera and an object
R2: distance between a second camera and the object
θ1: angle of view of the first camera
θ2: angle of view of the second camera
L: separation distance between the first camera and the second camera According to an embodiment of the disclosure, a separation distance L between the first camera module 110 and the second camera module 120 may be a distance between a center of the opening 1110a of the first camera module 110 and a center of the opening 1120a of the second camera module 120. According to another embodiment of the disclosure, the separation distance L between the first camera module 110 and the second camera module 120 may be a distance between an optical axis O1 of light being incident to the first camera module 110 and an optical axis O2 of light being incident to the second camera module 120 when the optical axis O1 is parallel to the optical axis O2. According to an embodiment of the disclosure, the separation distance L between the first camera module 110 and the second camera module 120 may be a distance between a center of the reflective member 1112 inside the first camera module 110 and a center of the second image sensor 1121 inside the second camera module 120.

According to an embodiment of the disclosure, the reflective member 1112 of the first camera module 110 may be a mirror. The electronic device 100 may move the angle of view of the first camera module 110 by adjusting an angle of the mirror.

According to an embodiment of the disclosure, the reflective member 1112 of the first camera module 110 may be a prism. The electronic device 100 may move the angle of view of the first camera module 110 by adjusting an angle of the prism.

According to an embodiment of the disclosure, the electronic device 100 may move the angle of view of the first camera module 110 by moving the image sensor 1111 of the first camera module 110. For this, the first camera module 110 may further include an image sensor driver for driving the image sensor 1111.

According to an embodiment of the disclosure, the electronic device 100 may move the angle of view of the first camera module 110 by moving a lens of the first camera module 110. According to an embodiment of the disclosure, the first camera module 110 may include an OIS lens, and the electronic device 100 may move the angle of view of the first camera module 110 by moving the OIS lens.

Although not shown in FIG. 11, each of the first camera module 110 and the second camera module 120 may further include a lens there inside.

Figure 12:
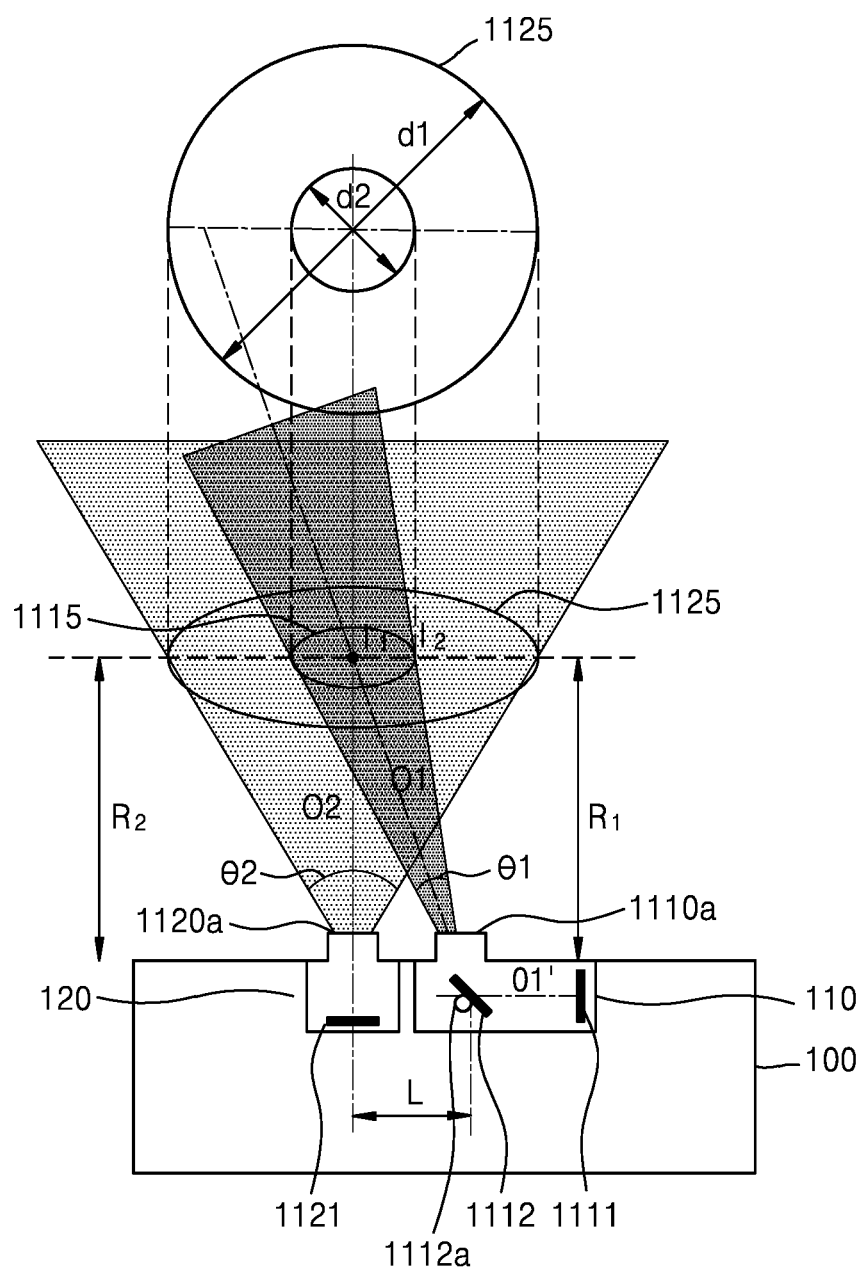
FIG. 12 illustrates structures of a first camera module and a second camera module according to an embodiment of the disclosure.

FIG. 12 illustrates structures of a first camera module and a second camera module according to an embodiment of the disclosure.

According to an embodiment of the disclosure, the first camera module 110 may further include a driver 1112a for moving or rotating the reflective member 1112. The driver 1112a may generate physical power by using an electrical signal. For example, the driver 1112a may include a driving coil and a magnetic material. When electricity flows through the driving coil, a magnetic field may be induced, and the magnetic material fixed to the reflective member 1112 rotate or move by the induced magnetic field may.

The first camera module 110 may move an optical axis O1 of light being incident to the first camera module 110 to an inclined state by using the driver 1112a. According to various embodiments of the disclosure, the driver 1112a may rotate or move the reflective member 1112 such that a center 11 of the first capture area 1115 is identical to a center 12 of the second capture area 1125.

According to an embodiment of the disclosure, the user may make an input of operating the driver 1112a of the first camera module 110 to cause the first capture area 1115 to move in the second capture area 1125. The user may cause a desired object to be positioned inside the first capture area 1115.

According to another embodiment of the disclosure, the processor 210 may generate a signal for controlling the driver 1112a automatically to compensate for shaking (e.g., motion blur) of an object or shaking (e.g., hand shaking) of the electronic device 100. For example, when shaking by a user occurs upon photographing, the processor 210 may sense a direction or intensity of the corresponding shaking, and generate a fine inclination motion in the reflective member 1112 to perform blur correcting (optical image stabilizing).

Figure 13:
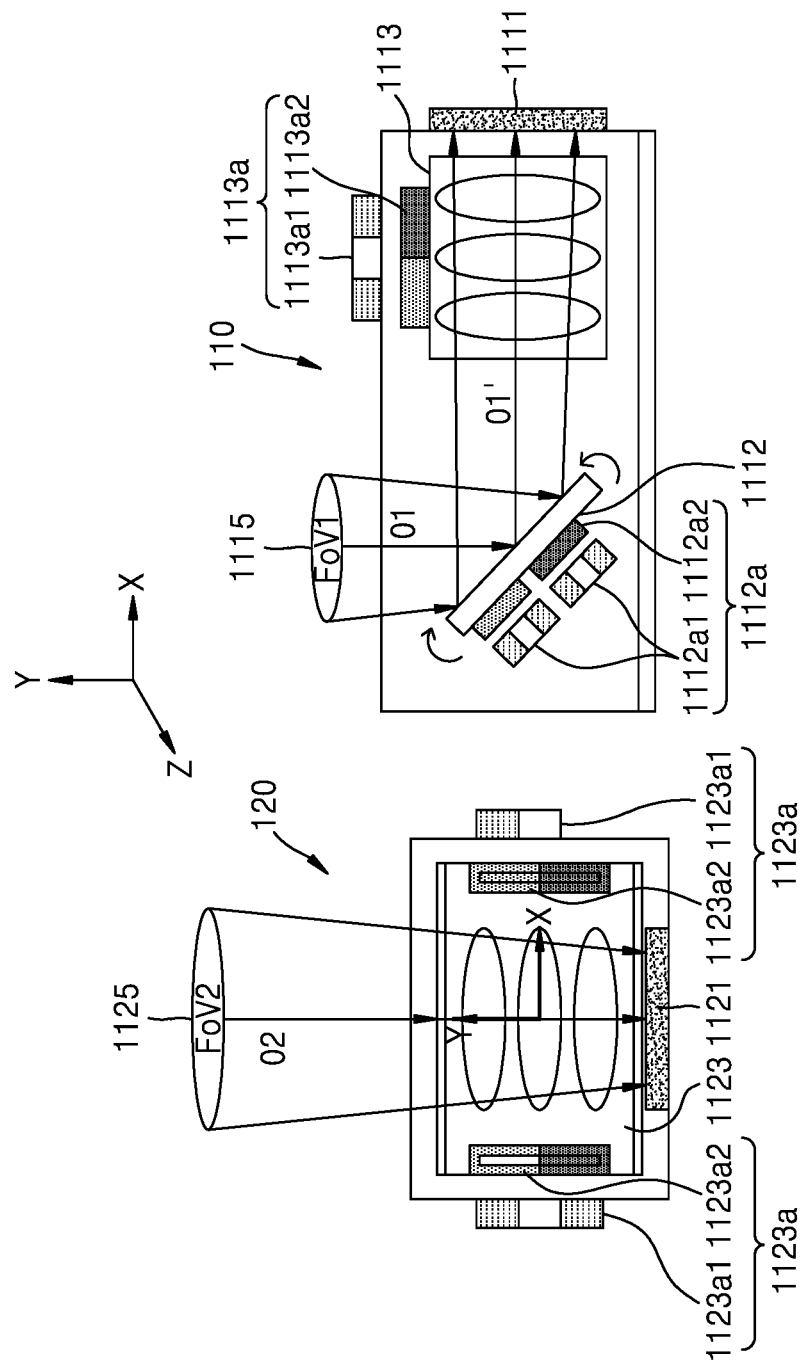
FIG. 13 illustrates internal configurations of a first camera module and a second camera module according to an embodiment of the disclosure.

FIG. 13 illustrates internal configurations of a first camera module and a second camera module according to an embodiment of the disclosure.

Referring to FIG. 13, the first camera module 110 may be spaced a designated separation distance L from the second camera module 120. The first camera module 110 may be configured to have a reflective optical system. In the first camera module 110, light being incident through the opening 1110a may be reflected through the reflective member 1112 and then incident to a lens 1113 and the image sensor 1111. The optical axis O1 being incident to be perpendicular to the surface in which the opening 1110a is formed may be reflected and then change to an optical axis O1' that is perpendicular to the image sensor 1111. The first camera module 110 may include the image sensor 1111, the reflective member 1112, and the lens 1113.

The image sensor 1111 may convert light to electronic image data through a photoelectric conversion effect. The image sensor 1111 may have a surface that is perpendicular to an optical axis O1' of light reflected through the reflective member 1112.

The reflective member 1112 may reflect light entered from outside through the opening 1110a to the image sensor 1111. An optical axis O1 of light being incident to the reflective member 1112 may be reflected and then change to an optical axis O1' that is perpendicular to the image sensor 1111. The reflective member 1112 may be implemented by using a reflector, such as a mirror, a prism, etc.

According to an embodiment of the disclosure, the reflective member 1112 may rotate or move through the driver 1112a. The driver 1112a may include a driving coil 1112a1 and a magnetic material 1112a2. When current flows through the driving coil 1112a1, an induced magnetic field may be formed, and the magnetic material 1112a2 (or the reflector member 1112 to which the magnetic material 1112a2 is fixed) may rotate or move by the induced magnetic field.

According to an embodiment of the disclosure, a movement (e.g., motion blur) of an object or shaking (e.g., hand shaking) of the electronic device 100 may be compensated by a movement of the reflective member 1112. For example, when an object moves or a user's hand shaking occurs upon photographing, the processor 210 may cancel the user's hand shaking or cause an image to be located at a center of the image sensor 1111 despite the object's movement, through a control signal for controlling the driver 1112a.

The lens 1113 may collect light reflected from an object. The collected light may be formed on the image sensor 1111. According to an embodiment of the disclosure, the lens 1113 may move within a designated range through the lens driver 1113a. The lens driver 1113a may include a driving coil 1113a1 and a magnetic material 1113a2. When current flows through the driving coil 1113a1, an induced magnetic field may be formed, the magnetic material 1113a2 (or the lens 1113 to which the magnetic material 1113a2 is fixed) may move by the induced magnetic field. By the movement of the lens 1113, a user's hand shaking may be compensated, or a focal distance of the first camera module 110 may be adjusted.

The second camera module 120 may be spaced a designated separation distance L from the first camera module 110. The second camera module 120 may be configured to have a direct type optical system. In the second camera module 120, light being incident through the opening 1120a may be directly incident to a lens 1123 and an image sensor 1121, without being reflected. An optical axis O2 of light being incident through the opening 1120a may be maintained in a form of a straight line. The second camera module 120 may include the image sensor 1121 and the lens 1123.

The image sensor 1121 may convert light into electronic image data through a photoelectric conversion effect. The image sensor 1121 may have a surface that is perpendicular to an optical axis O2 of light being incident through the opening 1120a.

The lens 1123 may collect light reflected from an object. The collected light may be formed on the second image sensor 1121. According to an embodiment of the disclosure, the lens 1123 may move within a designated range through the lens driver 1123a. The lens driver 1123a may include a driving coil 1123a1 and a magnetic material 1123a2. When current flows through the driving coil 1123a1, an induced magnetic field may be formed, and the magnetic material 1123a2 (or the lens 1123 to which the magnetic material 1123a2 is fixed) may move by the induced magnetic field. By the movement of the lens 1123, the user's hand shaking may be compensated, or a focal distance of the second camera module 120 may be adjusted.

Figure 14:
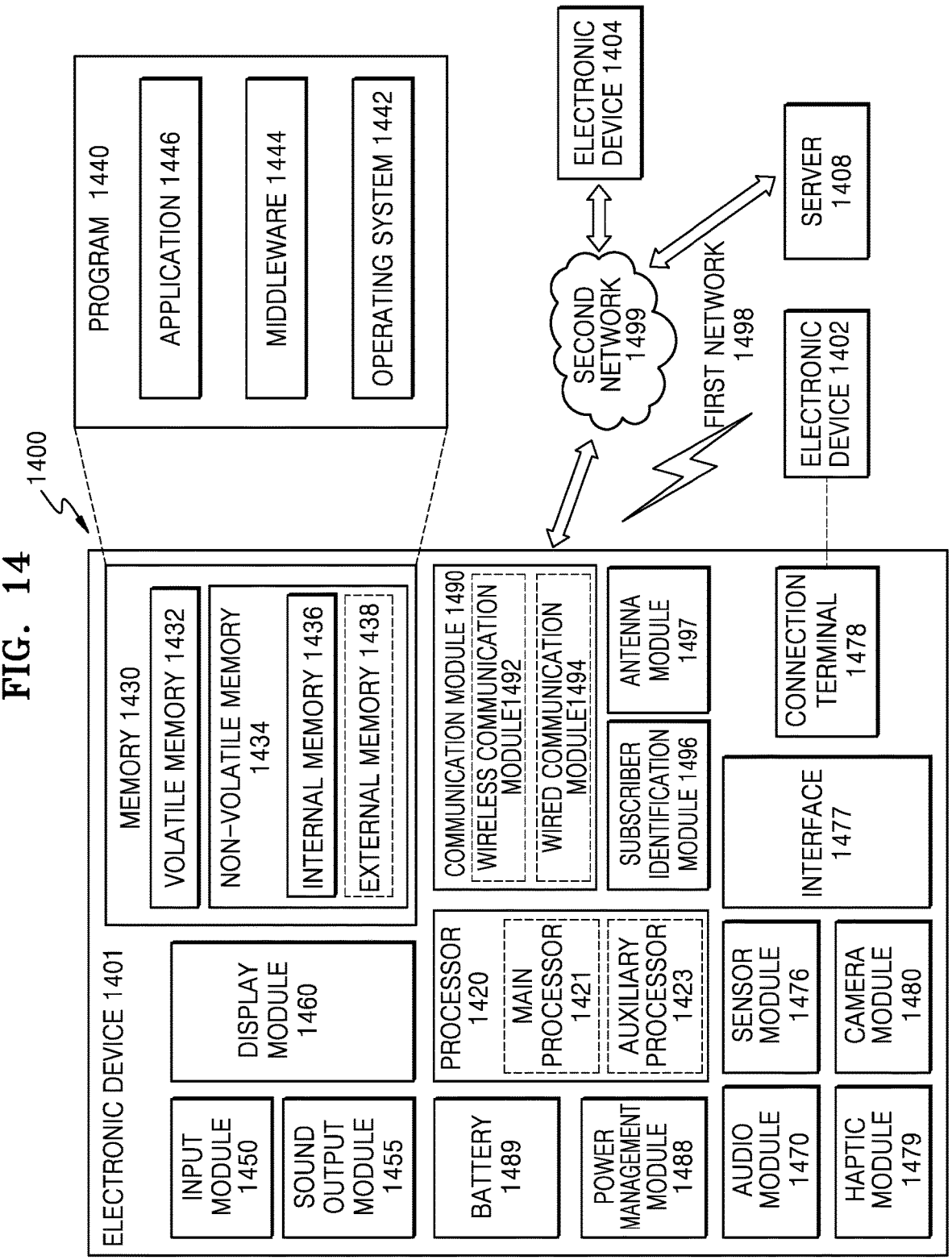
FIG. 14 is a block diagram of an electronic device in a network environment, according to various embodiments of the disclosure.

FIG. 14 is a block diagram of an electronic device in a network environment, according to various embodiments of the disclosure.

Referring to FIG. 14, in a network environment 1400, an electronic device 1401 may communicate with an electronic device 1402 through a first network 1498 (e.g., a short-range wireless communication network), or communicate with at least one of an electronic device 1404 or a server 1408 through a second network 1499 (e.g., a long-distance wireless communication network).

According to an embodiment of the disclosure, the electronic device 1401 may communicate with the electronic device 1404 through the server 1408. According to an embodiment of the disclosure, the electronic device 1401 may include a processor 1420, a memory 1430, an input module 1450, a sound output module 1455, a display module 1460, an audio module 1470, a sensor module 1476, an interface 1477, a connection terminal 1478, a haptic module 1479, a camera module 1480, a power management module 1488, a battery 1489, a communication module 1490, a subscriber identification module 1496, or an antenna module 1497.

According to some embodiments of the disclosure, in the electronic device 1401, at least one (e.g., the connection terminal 1478) of the above-mentioned components may be omitted, or one or more other components may be added. According to some embodiments of the disclosure, some (e.g., the sensor module 1476, the camera module 1480, or the antenna module 1497) of the above-mentioned components may be integrated into a single component (e.g., the display module 1460).

The processor 1420 may execute software (e.g., a program 1440) to control at least another component (e.g., a hardware or software component) of the electronic device 1401 connected to the processor 1420, and perform various data processing or operations. According to an embodiment of the disclosure, as at least one portion of data processing or operations, the processor 1420 may store a command or data received from another component (e.g., the sensor module 1476 or the communication module 1490) in the volatile memory 1432, process a command or data stored in the volatile memory 1432, and store result data in the non-volatile memory 1434.

According to an embodiment of the disclosure, the processor 1420 may include a main processor 1421 (e.g., a central processing unit (CPU) or an application processor), or an auxiliary processor 1423 (e.g., a graphic processing device, a neural processing unit (NPU), an image signal processor, a sensor hub processor, or a communication processor) being operable independently from or together with the central processing unit. For example, when the electronic device 1401 includes the main processor 1421 and the auxiliary processor 1423, the auxiliary processor 1423 may use lower power than the main processor 1421, or may be set to be specialized in a designated function. The auxiliary processor 1423 may be implemented separately from the main processor 1421 or as a part of the main processor 1421.

The auxiliary processor 1423 may control at least one portion of functions or states related to at least one component (e.g., the display module 1460, the sensor module 1476, or the communication module 1490) of the components of the electronic device 1401, for example, instead of the main processor 1421 that is in an inactive (e.g., sleep) state, or together with the main processor 1421 that is in an active (e.g., application execution) state.

According to an embodiment of the disclosure, the auxiliary processor 1423 (e.g., an image signal processor or a communication processor) may be implemented as a portion of a functionally related another component (e.g., the camera module 1480 or the communication module 1490).

According to an embodiment of the disclosure, the auxiliary processor 1423 (e.g., NPU) may include a hardware structure specialized for processing an artificial intelligence (AI) model. The AI model may be generated through machine learning. The machine learning may be performed by the electronic device 1401 on which an AI model is executed, or through a separate server (e.g., the server 1408). The learning algorithm may include, for example, supervised learning, unsupervised learning, semi-supervised learning, or reinforcement learning, although not limited thereto.

The AI model may include a plurality of artificial neural layers. The artificial neural layer may be one of deep neural network (DNN), convolutional neural network (CNN), recurrent neural network (RNN), restricted Boltzmann machine (RBM), deep belief network (DBN), bidirectional recurrent deep neural network (BRDNN), deep Q-networks, or two or more combinations of the above-mentioned examples, although not limited thereto. The AI model may include a software structure, in addition to or instead of a hardware structure.

The memory 1430 may store various data that is used by at least one component (e.g., the processor 1420 or the sensor module 1476) of the electronic device 1401. The data may include, for example, software (e.g., the program 1440) and input data or output data about commands related to the software. The memory 1430 may include a volatile memory 1432 or a non-volatile memory 1434.

The program 1440 may be stored as software in the memory 1430, and, the program 1440 may include, for example, operating system (OS) 1442, middleware 1444, or an application 1446.

The input module 1450 may receive a command or data that is to be used in a component (e.g., the processor 1420) of the electronic device 1401 from outside (e.g., a user) of the electronic device 1401. The input module 1450 may include, for example, a microphone, a mouse, a keyboard, a key (e.g., a button), or a digital pen (e.g., a stylus pen).

The sound output module 1455 may output a sound signal to the outside of the electronic device 1401. The sound output module 1455 may include, for example, a speaker or a receiver. The speaker may be used for general purposes, such as multimedia playback or recoding playback. The receiver may be used to receive incoming calls. According to an embodiment of the disclosure, the receiver may be implemented separately from the speaker or as a portion of the speaker.

The display module 1460 may visually provide information to the outside (e.g., a user) of the electronic device 1401. The display module 1460 may include, for example, a display, a hologram device, a projector, and a control circuit for controlling the corresponding device. According to an embodiment of the disclosure, the display module 1460 may include a touch sensor set to sense a touch, or a pressure sensor set to measure strength of a force generated by the touch.

The audio module 1470 may convert sound into an electrical signal or an electrical signal into sound. According to an embodiment of the disclosure, the audio module 1470 may obtain sound through the input module 1450, or may output sound through the sound output module 1455 or an external electronic device (e.g., the electronic device 1402 (e.g., a speaker or a headphone)) directly or wirelessly connected to the electronic device 1401.

The sensor module 1476 may sense an operation state (e.g., power or temperature) of the electronic device 1401, or an external environment state (e.g., a user's state), and generate an electrical signal or a data value corresponding to the sensed state. According to an embodiment of the disclosure, the sensor module 1476 may include, for example, a gesture sensor, a gyro sensor, a pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1477 may support one or more designated protocols that the electronic device 1401 may use to directly or wirelessly connect to an external electronic device (e.g., the electronic device 1402). According to an embodiment of the disclosure, the interface 1477 may include, for example, a high definition multimedia interface (HDMI), a universal serial bus (USB) interface, a secure digital (SD) card interface, or an audio interface.

The connection terminal 1478 may include a connector through which the electronic device 1401 may be physically connected to an external electronic device (e.g., the electronic device 1402). According to an embodiment of the disclosure, the connection terminal 1478 may include, for example, a HDMI connector, a USB connector, a SD card connector, or an audio connector (e.g., a headphone connector).

The haptic module 1479 may convert an electrical signal into an electrical stimulus or a mechanical stimulus (e.g., a vibration or movement) that a user may recognize through his/her tactile sensibility or kinesthetic sense. According to an embodiment of the disclosure, the haptic module 1479 may include, for example, a motor, a piezoelectric device, or an electrical stimulation device.

The camera module 1480 may photograph a still image and a moving image. According to an embodiment of the disclosure, the camera module 1480 may include one or more lenses, image sensors, image signal processors, or flashes.

The power management module 1488 may manage power that is supplied to the electronic device 1401. According to an embodiment of the disclosure, the power management module 1488 may be implemented as, for example, at least one portion of a power management integrated circuit (PMIC).

The battery 1489 may supply power to at least one component of the electronic device 1401. According to an embodiment of the disclosure, the battery 1489 may include, for example, a non-rechargeable primary cell, a rechargeable secondary cell, or a fuel cell.

The communication module 1490 may establish a direct (e.g., wired) communication channel or a wireless communication channel between the electronic device 1401 and an external electronic device (e.g., the electronic device 1402, the electronic device 1404, or the server 1408), and support communications through the established communication channel. The communication module 1490 may include one or more communication processors that operate independently from the processor (e.g., an application processor) 1420 and support direct (e.g., wired) communications or wireless communications.

According to an embodiment of the disclosure, the communication module 1490 may include a wireless communication module (e.g., a cellular communication module, a short-range communication module, or a global navigation satellite system (GNSS) communication module) 1492, or a wired communication module (e.g., a local area network (LAN) communication module or a power line communication module) 1494. The corresponding communication module of the camera modules may communicate with the external electronic device 1404 through a first network (e.g., a short-range communication network, such as Bluetooth, wireless fidelity (WiFi) direct, or infrared data association (IrDA)) 1498, or a second network (e.g., a long-distance communication network, such as a legacy cellular network, a 5th generation (5G) network, a next-generation communication network, the Internet, or a computer network (e.g., a LAN or a wide area network (WAN)) 1499. The various kinds of communication modules mentioned above may be integrated into a single component (e.g., a single chip), or implemented as a plurality of separate components (e.g., a plurality of chips). The wireless communication module 1492 may identify or authenticate the electronic device 1401 in a communication network, such as a first network 1498 or a second network 1499, by using subscriber information (e.g., international mobile subscriber identity (IMSI)) stored in a subscriber identification module 1496.

The wireless communication module 1492 may support a 5G network after a 4th generation (4G) network and next-generation communication technology (e.g., new radio (NR) access technology). The NR access technology may support enhanced mobile broadband (eMBB), massive machine type communications (mMTC), or ultra-reliable and low-latency communications (URLLC). The wireless communication module 1492 may support a high frequency band (e g, mmWave band), for example, to achieve a high data transfer rate.

The wireless communication module 1492 may support various technology, such as, for example, beamforming, massive multiple-input and multiple-output (MIMO), full dimensional MIMO (FD-MIMO), an array antenna, analog beam-forming, or a large scale antenna, for securing performance in a high frequency band. The wireless communication module 1492 may support various requirements defined in the electronic device 1401, an external electronic device (e.g., the electronic device 1404), or a network system (e.g., the second network 1499). According to an embodiment of the disclosure, the wireless communication module 1492 may support a peak data rate (e.g., 20 Gbps or higher) for achieving eMBB, loss coverage (e.g., 164 dB or lower) for achieving mMTC, or U-plane latency (e.g., downlink (DL) and uplink (UL) of 0.5 ms or lower, or a round trip of 1 ms or lower) for achieving URLLC.

The antenna module 1497 may transmit a signal or power to outside (e.g., an external electronic device), or receive a signal or power from outside. According to an embodiment of the disclosure, the antenna module 1497 may include an antenna including a conductor formed on a substrate (e.g., a PCB) or a radiator made of a conductive pattern. According to an embodiment of the disclosure, the antenna module 1497 may include a plurality of antennas (e.g., an array antenna). In this case, at least one antenna that is suitable for a communication method used in a communication network, such as the first network 1498 or the second network 1499, may be selected from among the plurality of antennas by, for example, the communication module 1490. A signal or power may be transmitted or received between the communication module 1490 and an external electronic device through the selected at least one antenna. According to some embodiments of the disclosure, another component (e.g., a radio frequency integrated circuit (RFIC)) than the radiator may be additionally formed as a part of the antenna module 1497. According to various embodiments of the disclosure, the antenna module 1497 may be an mmWave antenna module. According to an embodiment of the disclosure, the mmWave antenna module may include a printed circuit board (PCB), an radio frequency identification (RFID) positioned on or adjacent to a first surface (e.g., a lower surface) of the PCB to support a designated high frequency band (e.g., mmWave band), and a plurality of antennas (e.g., an array antenna) positioned on or adjacent to a second surface (e.g., a upper surface or a side surface) of the PCB to transmit or receive a signal of the designated high frequency band (e.g., mmWave band).

At least some of the above-mentioned components may be connected to each other through a communication method (e.g., a bus, a general purpose input and output (GPIO), a serial peripheral interface (SPI), or a mobile industry processor interface (MIPI)) between peripheral devices, and may exchange signals (e.g., commands or data) with each other.

According to an embodiment of the disclosure, commands or data may be transmitted or received between the electronic device 1401 and the external electronic device 1404 through the server 1408 connected to the second network 1499. The external electronic device 1402 or 1404 may be a device that is the same as or different from the electronic device 1401.

According to an embodiment of the disclosure, the entire or a part of operations that are executed on the electronic device 1401 may be executed on one or more external electronic devices among the external electronic device 1402, 1404, or 1408. For example, when the electronic device 1401 needs to perform a certain function or service automatically or in response to a request from a user or another device, the electronic device 1401 may request the one or more external electronic devices to perform at least a portion of the function or service, in addition to or instead of itself executing the function or service. The one or more external electronic devices that have received the request may execute at least a portion of the requested function or service or an additional function or service related to the request, and transfer a result of the execution to the electronic device 1401. The electronic device 1401 may process the result as it is or additionally and provide the processed result as at least a portion of a response to the request. For this, for example, cloud computing, distributed computing, mobile edge computing (MEG), or client-server computing technology may be used. The electronic device 1401 may provide an ultra-low delay service by using, for example, distributed computing or mobile edge computing. According to another embodiment of the disclosure, the external electronic device 1404 may include an internet of things (IoT) device. The server 1408 may be an intelligent server using machine learning and/or a neural network. According to an embodiment of the disclosure, the external electronic device 1404 or the server 1408 may be included in the second network 1499. The electronic device 140 may be applied to an intelligent service (e.g., smart home, smart city, smart car, or health care) based on 5G communication technology or IoT-related technology.

The electronic device 1401 of FIG. 14 may correspond to the electronic device 100, 100a, or 100b described above, the processor 1420 may correspond to the processor 210 described above, and the camera module 1480 may correspond to the first camera module 110 and the second camera module 120 described above.

Figure 15:
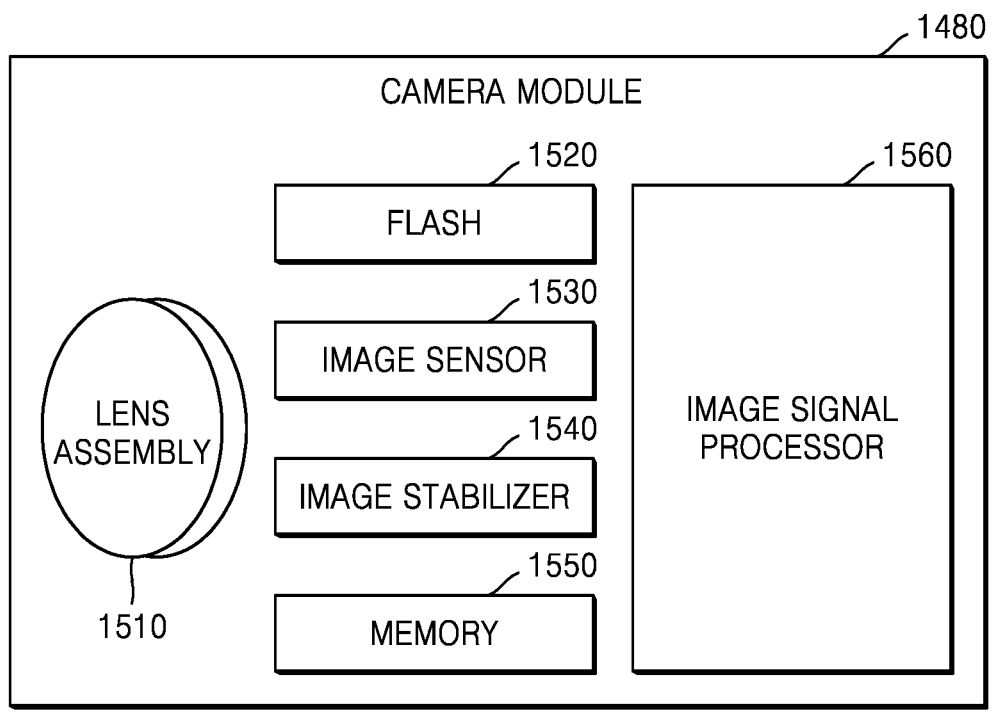
FIG. 15 is a block diagram of a camera module according to an embodiment of the disclosure.

FIG. 15 is a block diagram of the camera module 1480 according to an embodiment of the disclosure.

Referring to FIG. 15, the camera module 1480 may include a lens assembly 1510, a flash 1520, an image sensor 1530, an image stabilizer 1540, a memory 1550 (e.g., a buffer memory), or an image signal processor 1560.

The lens assembly 1510 may collect light emitted from an object to be photographed. The lens assembly 1510 may include one or more lenses. According to an embodiment of the disclosure, the camera module 1480 may include a plurality of lens assemblies 1510. In this case, the camera module 1480 may form, for example, a dual camera, a 360 degree camera, or a spherical camera. Some of the plurality of lens assemblies 1510 may have the same lens attributes (e.g., angle of view, focal distance, automatic focus, f number, or optical zoom), or at least one lens assembly may have one or more lens attributes that are different from those of the other lens assembly. The lens assembly 1510 may include, for example, a wide angle lens or a telescope lens.

The flash 1520 may emit light used to enrich light emitted or reflected from an object. According to an embodiment of the disclosure, the flash 1520 may include one or more light-emitting diodes (e.g., red-green-blue (RGB) LEDs, white LEDs, infrared LEDs, or ultraviolet LEDs) or a xenon lamp.

The image sensor 1530 may convert light emitted or reflected from an object and transferred through the lens assembly 1510 into an electrical signal to thereby obtain an image corresponding to the object. According to an embodiment of the disclosure, the image sensor 1530 may include an image sensor selected from among image sensors having different attributes, such as, for example, a RGB sensor, a black and white (BW) sensor, an IR sensor, or an UV sensor, a plurality of image sensors having the same attributes, or a plurality of image sensors having different attributes. Each image sensor included in the image sensor 1530 may be implemented by using, for example, a charged coupled device (CCD) senor or a complementary metal oxide semiconductor (CMOS) sensor.

The image stabilizer 1540 may move at least one lens included in the lens assembly 1510 or the image sensor 1530 in a preset direction or control operation characteristics (e.g., a read-out timing) of the image sensor 1530, in response to a movement of the camera module 1480 or the electronic device 1401 including the camera module 1480. The image stabilizer 1540 may compensate at least a part of a negative influence by the movement with respect to a photographed image. According to an embodiment of the disclosure, the image stabilizer 1540 may sense a movement of the camera module 1480 or the electronic device 1401 by using a gyro sensor (not shown) or an acceleration sensor (not shown) positioned inside or outside the camera module 1480. According to an embodiment of the disclosure, the image stabilizer 1540 may be implemented as, for example, an optical image stabilizer.

The memory 1550 may at least temporarily store at least one part of an image obtained through the image sensor 1530 for the next image processing task. For example, when image acquisition according to a shutter is delayed or when a plurality of images are obtained at high speed, an acquired original image (e.g., a Bayer-patterned image or a high-resolution image) may be stored in the memory 1550, and a copy image (e.g., a low-resolution image) corresponding to the original image may be previewed through the display module 1460. Thereafter, when a designated condition is satisfied (e.g., a user input or a system command), at least a part of the original image stored in the memory 1550 may be obtained and processed by, for example, the image signal processor 1560. According to an embodiment of the disclosure, the memory 1550 may be configured as at least a portion of the memory 1430, or as a separate memory that operates independently from the memory 1430.

The image signal processor 1560 may perform one or more image processing operations on an image obtained through the image sensor 1530 or an image stored in the memory 1550. The one or more image processing operations may include, for example, depth map generation, 3 dimensional (3D) modeling, panorama generation, extraction of feature points, image composition, or image compensation (e.g., noise reduction, resolution adjustment, brightness adjustment, blurring, sharpening, or softening). Additionally or alternatively, the image signal processor 1560 may perform a control (e.g., exposure time control, read out timing control, etc.) on at least one (e.g., the image sensor 1530) of components included in the camera module 1480.

An image processed by the image signal processor 1560 may be again stored in the memory 1550 for additional processing, or provided to an external component (e.g., the memory 1430, the display module 1460, the electronic device 1402, the electronic device 1404, or the server 1408) of the camera module 1480.

According to an embodiment of the disclosure, the image signal processor 1560 may be configured as at least one portion of the processor 1420, or as a separate processor that operates independently from the processor 1420. When the image signal processor 1560 is configured as a separate processor from the processor 1420, at least one image processed by the image signal processor 1560 may be displayed as it is or after being subject to additional image processing by the processor 1420, through the display module 1460.

According to an embodiment of the disclosure, the electronic device 1401 may include a plurality of camera modules 1480 having different attributes or functions. In this case, for example, at least one of the plurality of camera modules 1480 may be a wide angle camera, and at least another one of the plurality of camera modules 1480 may be a telescope camera. Similarly, at least one of the plurality of camera modules 1480 may be a front camera, and at least another one of the plurality of camera modules 1480 may be a rear camera.

The electronic device according to various embodiments of the disclosure may be one of various types of devices. The electronic device may include, for example, a portable communication device (e.g., a smart phone), a computer device, a portable multimedia device, portable medical equipment, a camera, a wearable device, or a home appliance. The electronic device according to an embodiment of the disclosure is not limited to the above-mentioned devices.

It is to be understood that various embodiments of the disclosure and terms used in the various embodiments of the disclosure are not intended to limit technical features written in the disclosure to specific embodiments, and include various changes, equivalents, or substitutes of the corresponding embodiments. In the descriptions of the drawings, similar or related components may be assigned similar reference numerals. The singular forms of nouns corresponding to an item include one or a plurality of pieces of the item unless the context clearly dictates otherwise. As used herein, expressions such as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in another aspect (e.g., importance or order). It is to be understood that if a certain component (e.g., a first component) is referred to, with or without the term "operatively" or "communicatively," as "coupled with," "coupled to," "connected with," or "connected to" another component (e.g., a second component), the certain component may be coupled with the other component directly (e.g., wiredly), wirelessly, or via a third component.

The term "module" used in various embodiments of the disclosure may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments of the disclosure may be implemented as software (e.g., a program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and not simply a signal (e.g., an electromagnetic wave), but this term does not differentiate between whether data is semi-permanently stored in the storage medium and whether the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE™), or between two user devices (e.g., smart phones) directly. When distributed online, at least part of the computer program product may be temporarily generated or at least temporarily stored in the machine-readable storage medium, such as a memory of the manufacturer's server, a server of the application store, a relay server, etc.

According to various embodiments of the disclosure, each component (e.g., a module or a program) of the above-described components may include a single entity or multiple entities, and some of the multiple entities may be distributed to another component. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by a module, a program, or another component may be carried out sequentially, in parallel, repeatedly, or heuristically, or one or more of the operations may be executed in a different order or omitted, or one or more other operations may be added.

The invention claimed is:

1. An electronic device comprising:
   a first camera module of which an angle of view is movable;
   a second camera module of which an angle of view is greater than the angle of view of the first camera module; and
   at least one processor configured to:
      generate, in a first mode, an output image from first image data generated by the first camera module, control a direction of the angle of view of the first camera module while tracking a first object to change a field of view (FOV) of the first camera module,
      perform a driving preparation operation for the second camera module to change a driving operation of the second camera module from the first mode to a second mode, based on a determination that the first object is to leave the FOV of the first camera module, and
      generate, when the driving operation of the second camera module has completely changed to the second mode, the output image from second image data generated by the second camera module.

2. The electronic device of claim 1, wherein the at least one processor is further configured to generate the output image by cropping an area corresponding to the FOV of the first camera module from the second image data of the second camera module, when an initial output image generated after the first mode changes to the second mode is processed.

3. The electronic device of claim 1, wherein the at least one processor is further configured to:
   calculate a velocity of the first object; and
   determine whether the first object is to leave the FOV of the first camera module, based on the velocity of the first object.

4. The electronic device of claim 1, wherein the at least one processor is further configured to determine, when a moving velocity of the first object is higher than a moving velocity of the FOV of the first camera module, that the first object is to leave the FOV of the first camera module.

5. The electronic device of claim 1, wherein the at least one processor is further configured to determine that the first object is to leave the FOV of the first camera module, in at least one case of when a moving path of the first object is expected to leave a FOV movable range of the first camera module, when a moving velocity of the first object is higher than a moving velocity of the FOV of the first camera module, or when a size of the first object in the first image data is expected to become larger than the FOV of the first camera module.

6. The electronic device of claim 1, wherein the at least one processor is further configured to determine that the first object is to leave the FOV of the first camera module, when a size of the first object is larger than the FOV of the first camera module.

7. The electronic device of claim 1, wherein the at least one processor is further configured to:
   perform a driving preparation operation for the first camera module to change a driving operation of the first camera module from the second mode to the first mode, based on a determination that the first camera module is capable of tracking the first object, while operating in the second mode; and generate the output image from the first image data of the first camera module, when the driving operation of the first camera module has completely changed to the first mode.

8. The electronic device of claim 1,
wherein the first camera module comprises a prism, and
wherein the at least one processor is further configured to move the angle of view of the first camera module by moving the prism.

9. The electronic device of claim 1, wherein the at least one processor is further configured to move the angle of view of the first camera module by moving at least one of at least one lens, a mirror, or an image sensor of the first camera module.

10. The electronic device of claim 1, wherein a movable range of the angle of view of the first camera module is included in a range of an angle of view of the second camera module.

11. The electronic device of claim 1, wherein the driving preparation operation for the second camera module comprises an operation of changing image quality and brightness of the second camera module to image quality and brightness of the first camera module.

12. The electronic device of claim 1, wherein the driving preparation operation for the second camera module comprises an operation of changing a frame rate of the second camera module to a frame rate of the first camera module.

13. The electronic device of claim 1, wherein the driving preparation operation for the second camera module comprises interpolation processing between the second image data of the second camera module and the first image data of the first camera module.

14. The electronic device of claim 1, wherein the driving preparation operation for the second camera module comprises an operation of applying power to the second camera module that is in a power-off state and setting a parameter value.

15. The electronic device of claim 1, wherein the at least one processor is further configured to obtain a three-dimensional depth of the first object, calculate an angular velocity of the first object, and determine whether the first object is to leave the FOV of the first camera module based on the angular velocity of the first object.

16. A method of controlling an electronic device, the method comprising:
generating, in a first mode, an output image from first image data generated by a first camera module of which an angle of view is movable;
controlling a direction of the angle of view of the first camera module while tracking a first object to change a field of view (FOV);
performing a driving preparation operation for a second camera module of which an angle of view is greater than the first camera module to change a driving operation of the second camera module from the first mode to a second mode, based on a determination that the first object is to leave a FOV of the first camera module; and
generating, when the driving operation of the second camera module has completely changed to the second mode, the output image from second image data generated by the second camera module.

17. The method of claim 16, wherein the second camera module is in deactivated state while the output image from the first image data is being generated by the first camera module in the first mode.

18. The method of claim 17, wherein the driving preparation operation for the second camera module is performed in the deactivated state.

19. The method of claim 16, wherein the first camera module is in deactivated state while the output image from the second image data is being generated by a second camera module in the second mode.

20. A non-transitory computer-readable recording medium having recorded thereon a program, which when executed on a computer performs the following operations:
generating, in a first mode, an output image from first image data generated by a first camera module of which an angle of view is movable;
controlling a direction of the angle of view of the first camera module while tracking a first object to change a field of view (FOV);
performing a driving preparation operation for a second camera module of which an angle of view is greater than the first camera module to change a driving operation of the second camera module from the first mode to a second mode, based on a determination that the first object is to leave a FOV of the first camera module; and
generating, when the driving operation of the second camera module has completely changed to the second mode, the output image from second image data generated by the second camera module.

* * * * *